United States Patent
Warlock et al.

(10) Patent No.: US 9,128,783 B1
(45) Date of Patent: Sep. 8, 2015

(54) SCHEDULING AND EXECUTING MODEL COMPONENTS IN RESPONSE TO UN-MODELED EVENTS DETECTED DURING AN EXECUTION OF THE MODEL

(71) Applicant: The MathWorks, Inc., Natick, MA (US)

(72) Inventors: Arwen M. Warlock, Waltham, MA (US); Biao Yu, Sharon, MA (US); Matthew J. Englehart, Olmsted Township, OH (US); Peter S. Szpak, Newton, MA (US); Murali K. Yeddanapudi, Lexington, MA (US); Yuan Cao, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/564,460

(22) Filed: Dec. 9, 2014

Related U.S. Application Data

(60) Provisional application No. 61/947,822, filed on Mar. 4, 2014.

(51) Int. Cl.
*G06F 13/00* (2006.01)
*G06F 9/54* (2006.01)

(52) U.S. Cl.
CPC .................................... *G06F 9/542* (2013.01)

(58) Field of Classification Search
CPC ............... G06F 8/30; G06F 8/41; G06F 8/48; G06F 9/542
USPC .......................... 717/106, 140, 145; 719/318
See application file for complete search history.

(56) References Cited

U.S. PATENT DOCUMENTS

| | | | |
|---|---|---|---|
| 6,968,546 B2 * | 11/2005 | Lueh | 717/158 |
| 8,683,426 B2 | 3/2014 | Englehart | |
| 2005/0160397 A1 | 7/2005 | Szpak et al. | |
| 2009/0271772 A1 * | 10/2009 | Stephenson et al. | 717/145 |
| 2014/0075409 A1 * | 3/2014 | Fischer et al. | 717/105 |

* cited by examiner

*Primary Examiner* — Andy Ho
(74) *Attorney, Agent, or Firm* — Harrity & Harrity, LLP

(57) ABSTRACT

A device may receive a model including a group of blocks, and may receive a command to execute the model. The device may assign a parameter sample time to a subset of blocks of the group of blocks. The parameter sample time may permit a block, of the subset of blocks, to be executed based on a parameter change event detected during the execution of the model. The device may cause the model to be executed after assigning the parameter sample time to the subset of blocks. The device may detect a parameter change event, associated with the model, prior to the execution of the model being completed. The parameter change event may include an event that is external to the execution of the model. The device may cause at least one block, of the subset of blocks, to be executed based on the detecting the parameter change event.

22 Claims, 16 Drawing Sheets

SCHEDULING AND EXECUTING MODEL COMPONENTS IN RESPONSE TO UN-MODELED EVENTS DETECTED DURING AN EXECUTION OF THE MODEL

RELATED APPLICATION(S)

This application claims priority under 35 U.S.C. §119 to U.S. Provisional Patent Application No. 61/947,822, filed on Mar. 4, 2014, the content of which is incorporated by reference herein in its entirety.

DETAILED DESCRIPTION

The following detailed description of example implementations refers to the accompanying drawings. The same reference numbers in different drawings may identify the same or similar elements.

A model (e.g., a graphical model), associated with a technical computing environment (TCE), may include a group of model components (e.g., a group of blocks). The TCE may allow a block to be assigned to execute in response to an event that is described within the model (e.g., using function call modeling semantics). However, the TCE may not allow the block to be assigned to execute in response to an event that is not modeled, such as a user interaction during model execution (e.g., a modification of a block parameter during model execution, an interaction with a human machine interface (HMI) during model execution, etc.) or another type of externally created event (e.g., an un-modeled event). While the processes and/or methods described herein are described in terms of an externally created event in the form of a user modifying a parameter during model execution, these processes and/or methods may equally apply to another type of externally created event.

With regard to modifying a parameter of a block during model execution, the TCE may require the user to choose between allowing modification (e.g., tuning) of the parameter and efficiently executing the model (e.g., since the block must be re-executed in order for the effect of modifying the parameter to be reflected in a result of executing the model). The choice for scheduling execution of the block may be to either execute the block once at the start of the execution of the model or to execute the block repeatedly (e.g., periodically) during the execution of the model. Implementations described herein provide a user with both options by allowing the block to be executed as seldom as possible while still allowing the impact of modifying the parameter to be reflected in the result of executing the model. This may be achieved, for example, by implementing a parameter sample time in the TCE that allows the block to be executed at startup (e.g., to initialize the block) and allows the block to be re-executed when the parameter of the block is modified to reflect parameter modification (e.g., to update a state of the block). Implementations described herein may allow for detecting an un-modeled event during an execution of a model, causing one or more blocks, included in the model, to be re-executed in response to the un-modeled event, and continuing the execution of the model after causing the one or more blocks to be re-executed. Causing the one or more blocks of the model to be re-executed in response to the un-modeled event, rather than being re-executed at each time step during model execution, may allow the performance of the model to be improved by increasing efficiency of execution of the model without sacrificing accuracy of a result determined based on executing the model.

Figure 1A:
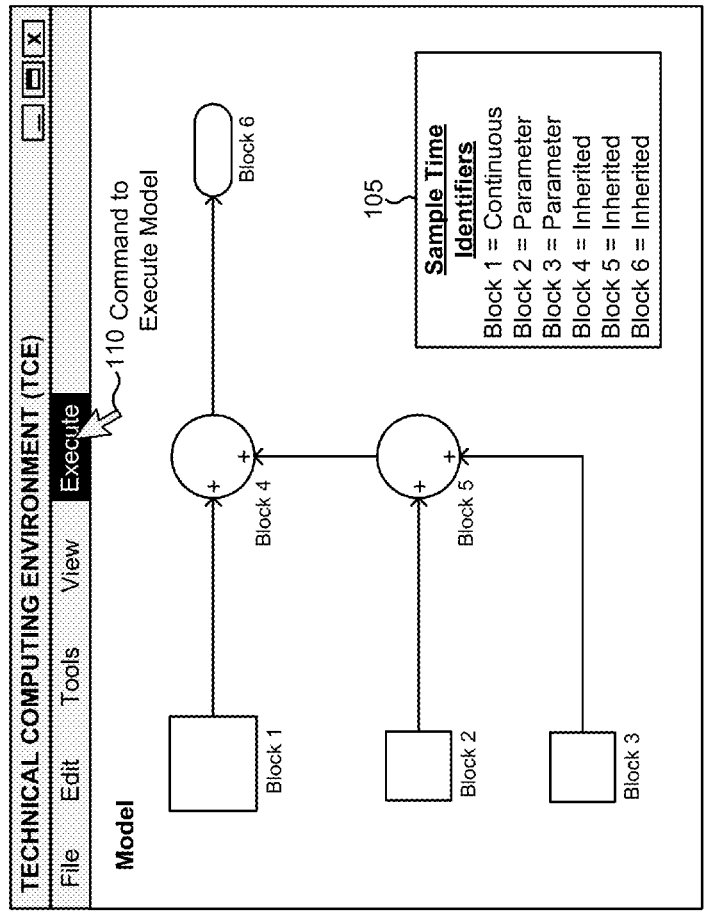
FIGS. 1A-1C are diagrams of an overview of an example implementation described herein.
Figure 1B:
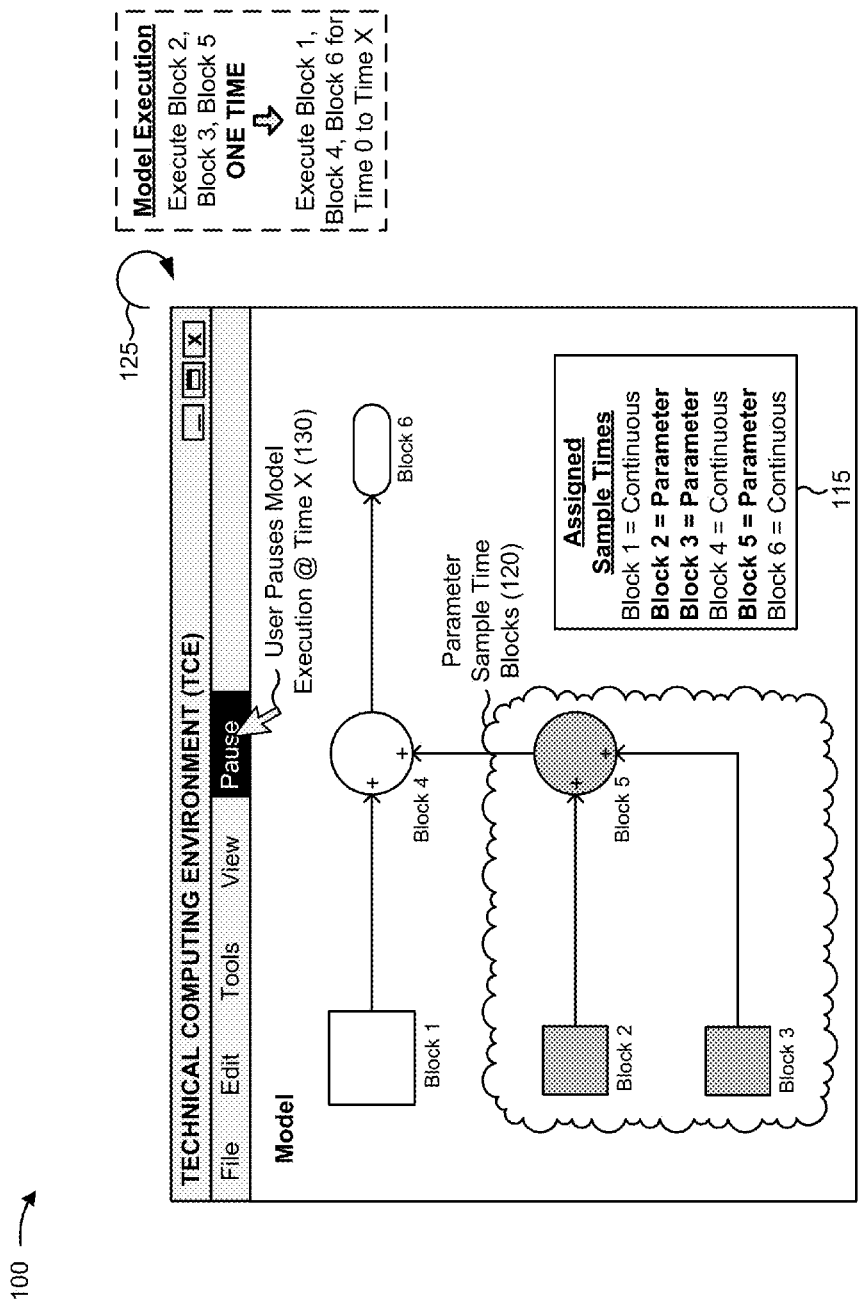
Figure 1C:
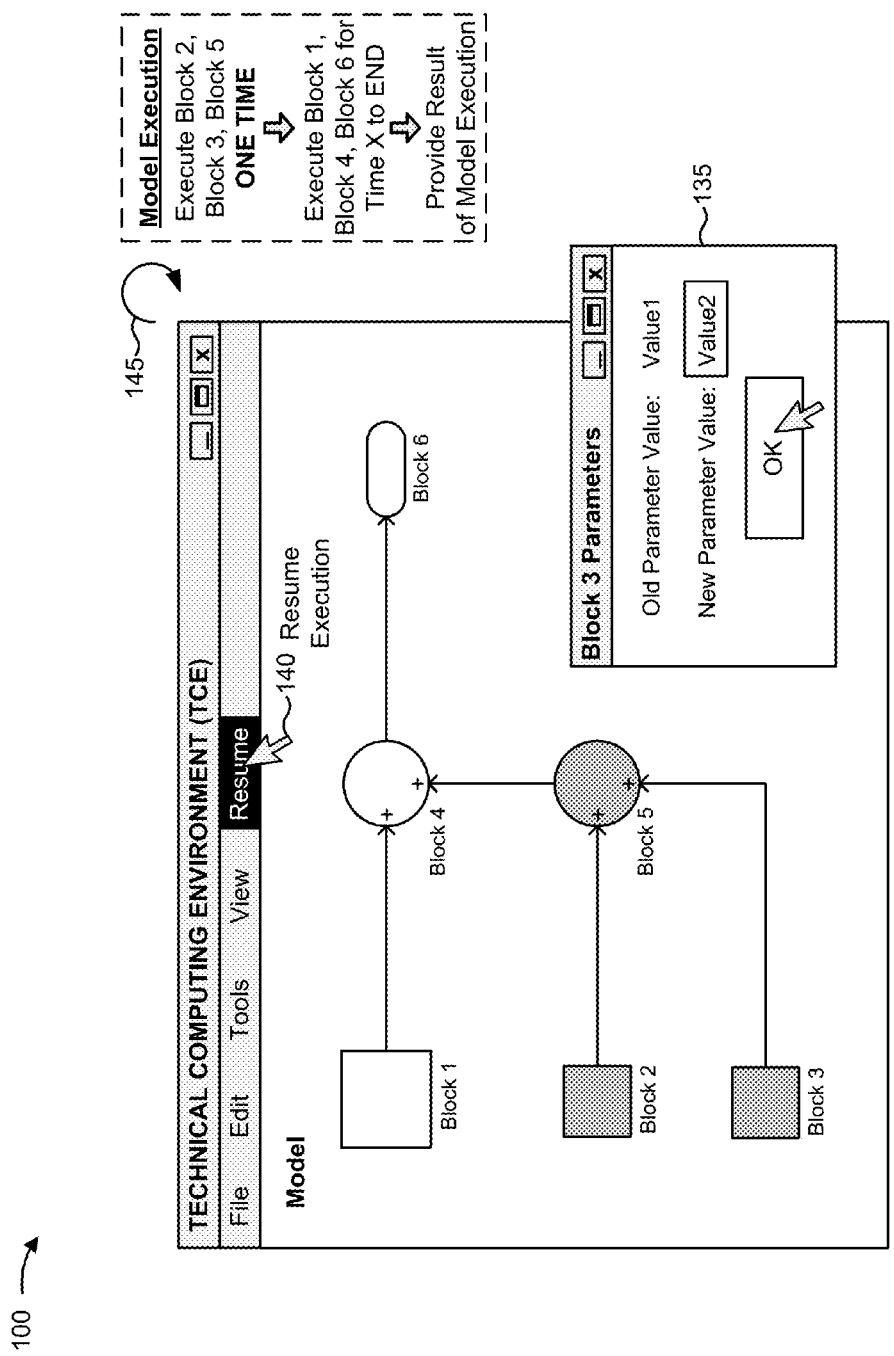

FIGS. 1A-1C are diagrams of an overview of an example implementation 100 described herein. For the purposes of example implementation 100, assume that a TCE, hosted by a client device, has received (e.g., based on input from a user) a model that includes a group of blocks, identified as block 1 through block 6.

As shown in FIG. 1A, and by reference number 105, the TCE may determine a sample time identifier associated with each block. For example, the sample time identifier may be determined based on user input, based on default configurations of each block, based on an analysis of the model, etc. As shown, the block 1 sample time identifier may identify a continuous sample time for block 1 (e.g., indicating that block 1 is to produce an output at each major and minor time step during execution of the model), the block 2 sample time identifier may identify a parameter sample time for block 2 (e.g., indicating that block 2 is to produce an output once at the start of the execution of the model, and in response to an externally created event that modifies a parameter of block 2), the block 3 sample time identifier may identify the parameter sample time for block 3, the block 4 sample time identifier may identify an inherited sample time for block 4 (e.g., indicating that a sample time is to be inherited from another block), the block 5 sample time identifier may identify the inherited sample time for block 5, and the block 6 sample time identifier may identify the inherited sample time for block 6. As shown by reference number 110, the user may indicate (e.g., by selecting an Execute menu item) that the TCE is to execute the model.

As shown in FIG. 1B, and by reference number 115, the TCE may compile the model and may assign sample times to each block (e.g., based on an inferencing mechanism such as sample time propagation rules associated with the TCE and/or based on the sample time identifiers associated with each block). As shown, the TCE may assign the continuous sample time to block 1, block 4, and block 6, and may assign the parameter sample time to block 2, block 3, and block 5. As shown by reference number 120, the TCE may determine a set of blocks to which the parameter sample time has been assigned (e.g., including block 2, block 3, and block 5) before proceeding with the execution of the model. As shown by reference number 125, the TCE may begin the execution of the model by executing block 2, block 3, and block 5 one time (e.g., such that each block produces a first output). As further shown, the TCE may then proceed with repeatedly (e.g., at each time step) executing a set of blocks to which the continuous sample time has been assigned (e.g., block 1, block 4, and block 6). As shown, the TCE may continue to execute block 1, block 4, and block 6 for a period of time (e.g., from time 0 to time X), without re-executing block 2, block 3, or block 5. As shown by reference number 130, the user may pause (e.g., by selecting a Pause menu item) the execution of the model at time X. While some implementations and examples described herein may be described in the context of the parameter change event occurring and/or being detected causing an execution of a model to be paused, in other implementations and examples, the parameter change event may occur and/or be detected without causing the execution of the model to be paused (e.g., such that parameters may be modified without pausing the execution of the model).

As shown in FIG. 1C, and by reference number 135, the user may indicate (e.g., by selecting block 3) that the user wishes to modify a parameter of block 3, may modify (e.g., via a block 3 dialog box) the block 3 parameter, and may finalize (e.g., by selecting an OK button the modification of the block 3 parameter. As shown, the TCE may determine that an externally created event (e.g., a parameter change event) has occurred based on the user finalizing the block 3 parameter modification. As shown by reference number 140, the user may then indicate (e.g., by selecting a Resume menu item) that the execution of the model is to resume.

As shown by reference number 145, the TCE may re-execute the set of blocks to which the parameter sample time was assigned based on determining that the parameter change event occurred during the execution of the model. In other words, the TCE may re-execute block 2, block 3, and block 5 one time (e.g., such that each block produces a second output), and the TCE may once again proceed with repeatedly executing block 1, block 4, and block 6. As shown, the TCE may continue to execute block 1, block 4, and block 6 from time X until the end of the model execution, without re-executing block 2, block 3, or block 5. As shown, the TCE may then provide a result of the execution of the model. In this way, an un-modeled event may be detected during an execution of a model, one or more blocks, included in the model, may be re-executed in response to the un-modeled event, and the execution of the model may continue after the one or more blocks are re-executed.

Figure 2:
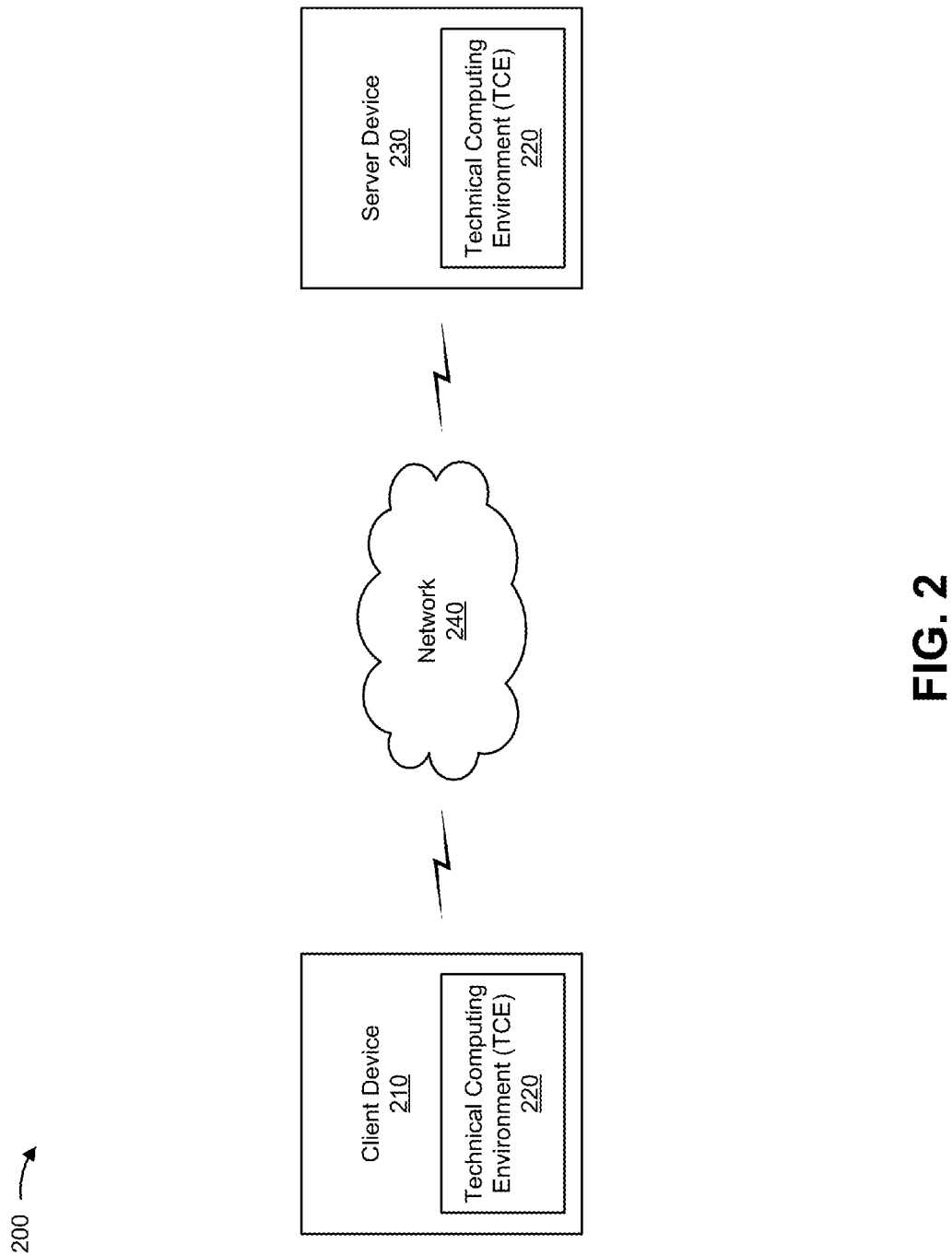
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing information associated with executing a model in response to a parameter change event (e.g., an event that is not modeled) associated with the model. For example, client device 210 may include a computing device, such as a desktop computer, a laptop computer, a tablet computer, a mobile phone (e.g., a smart phone, a radiotelephone, etc.), or a similar device. In some implementations, client device 210 may be capable of receiving a model, compiling the model, assigning sample times to blocks included in the model, causing the model to be executed, and/or providing a result of executing the model. Additionally, or alternatively, client device 210 may be capable of detecting a parameter change event, associated with the model, and executing one or more blocks of the model based on detecting the parameter change event. In some implementations, client device 210 may receive information from and/or transmit information to server device 230.

Client device 210 may host TCE 220. TCE 220 may include any hardware-based logic or a combination of hardware and software-based logic that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, Simscape™ software, SimEvents® software, etc., by The MathWorks, Inc.; VisSim by Visual Solutions; LabView® by National Instruments; StateWORKS Studio by StateWORKS, etc.), or another type of environment, such as a hybrid environment that may include, for example, a text-based environment and a graphically-based environment.

TCE 220 may include a modeling system that may be used in the creation of a model and that may enable generation of executable code based on the model. For example, TCE 220 may include a graphical modeling application that provides a user interface for a computing environment. Additionally, or alternatively, TCE 220 may include a graphical modeling application that provides a user interface for modeling and/or simulating (e.g., by executing a model) a dynamic system (e.g., based on differential equations, difference equations, algebraic equations, discrete events, discrete states, stochastic relations, etc.). A dynamic system (either natural or man-made) may include a system, where a response of the system at any given time may be a function of input stimuli associated with the system, a current state associated with the system, and/or a current time.

The system represented by a model may have various execution semantics that may be represented in the model as a collection of modeling entities, often referred to as blocks (e.g., including algorithm blocks). A block may generally refer to a portion of functionality that may be used in the model. The block may be represented graphically, textually, and/or stored in some form of internal representation. Also, a particular visual depiction used to represent the block, for example in a graphical block diagram, may be a design choice. A block may be hierarchical in that the block itself may comprise one or more blocks that collectively make up the block.

A model may include blocks with relationships between the blocks, and the relationships and/or the blocks may have attributes associated with them. The blocks my include model elements, such as blocks and/or ports. The relationships may include model elements, such as lines (e.g., connector lines) and references. The attributes may include model elements, such as value information and meta information for the model element associated with the attributes. A model may be associated with configuration information. The configuration information may include information for the model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a model may have executable semantics and/or may be executable. An executable model may be a time based block diagram. A time based block diagram may consist, for example, of blocks connected by lines (e.g., connector lines) that can represent signal values or that can represent an algorithm. The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), algorithms (e.g., to be applied to an input, an output, a value, etc.), or the like. The attributes may consist of meta information such as sample times, dimensions, complexity (e.g., whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic or algebraic system (e.g., by buffering variable values, by summing all variables of a certain type to 0, or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks may be causal and/or non-causal. For example, a model may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In some implementations, a block may include or otherwise correspond to a non-causal modeling function or operation. An example of a non-causal modeling function may include a function, operation, or equation that may be executed in different fashions depending on one or more inputs, circumstances, and/or conditions. Put another way, a non-causal modeling function or operation may include a function, operation, or equation that does not have a predetermined causality. For instance, a non-causal modeling function may include an equation (e.g., X=2Y) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

Server device 230 may include one or more devices capable of receiving, generating, storing, processing, and/or providing information associated with executing a model in response to a parameter change event associated with the model. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
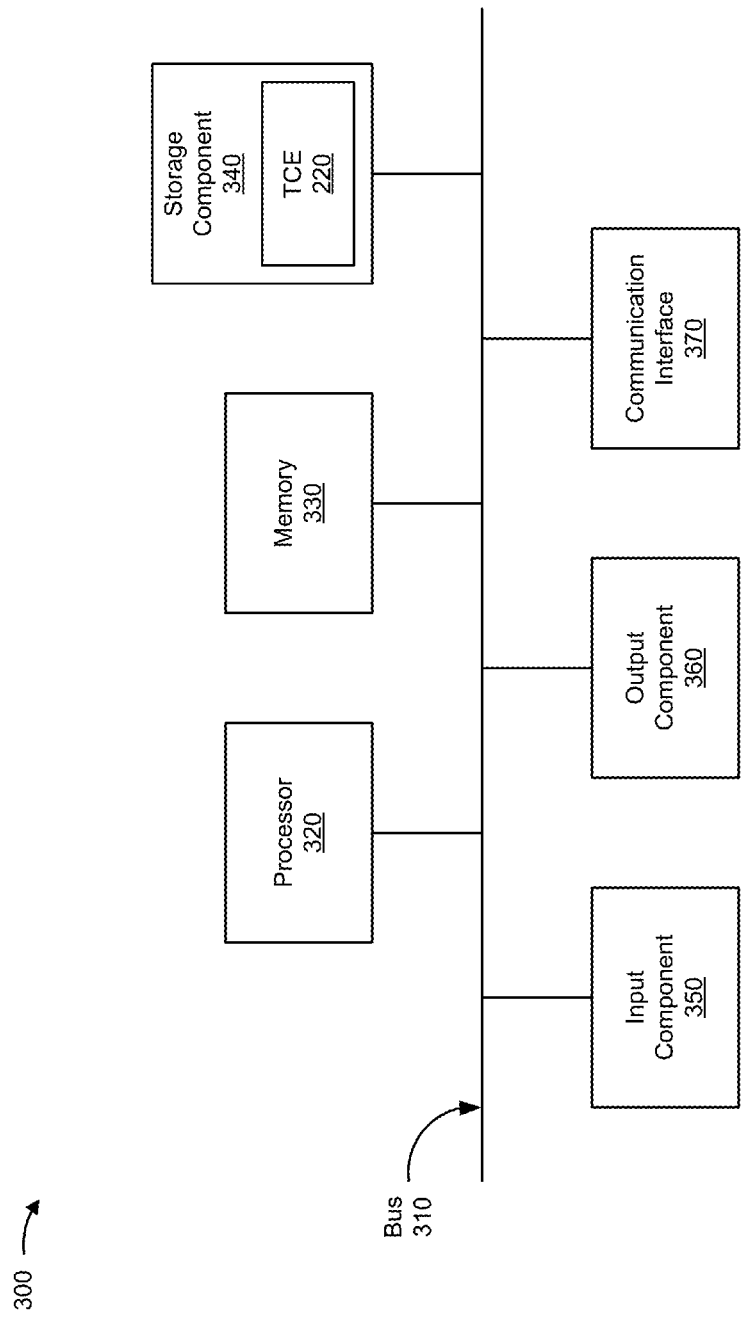
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4I are diagrams of an example implementation 400 of detecting an un-modeled event during an execution of a model, causing one or more blocks, included in the model, to be re-executed in response to the un-modeled event, and continuing the execution of the model after causing the one or more blocks to be re-executed. While the processes and/or methods described with regard to example implementation 400 are described in terms of an un-modeled event in the form of a parameter change event based on a user interaction, these processes and/or methods may equally apply to another type of un-modeled event, such as an un-modeled event associated with a programmatic instruction, a programmatic event, user initiated input, etc., received by TCE 220, that causes TCE 220 to modify, alter, update, etc. a parameter of one or more blocks in response to the event. For the purposes of example implementation 400, assume that TCE 220 allows for a parameter sample time (e.g., a sample time indicating that a block is to produce an output once at the start of the execution of a model and in response to a externally created event that occurs during the model execution) to be assigned to one or more blocks included in a model, identified as Model X.

Figure 4A:
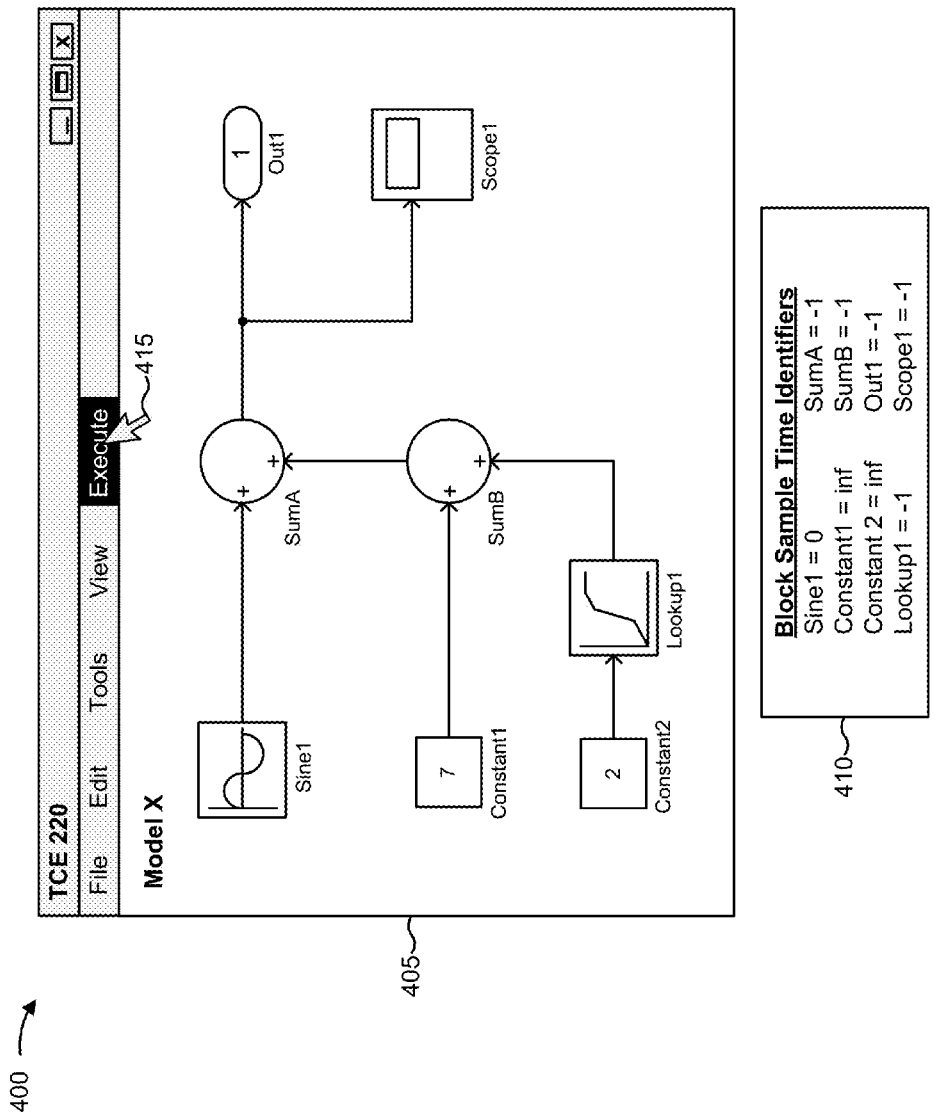
FIGS. 4A-4I are diagrams of an example implementation of detecting an un-modeled event during an execution of a model, causing one or more blocks, included in the model, to be re-executed in response to the un-modeled event, and continuing the execution of the model after causing the one or more blocks to be re-executed.

As shown in FIG. 4A, and by reference number 405, Model X may include a group of blocks including a sine block (e.g., Sine1), a first sum block (e.g., SumA), a first constant block (e.g., Constant1 with a constant value of 7), a second constant block (e.g., Constant2 with a constant value of 2), a lookup table block (e.g., Lookup1), a second sum block (e.g., SumB), an output block (e.g., Out1), and a scope block (e.g., Scope1).

As shown by reference number 410, TCE 220 may determine a sample time identifier corresponding to each block of Model X. For example, the sample time identifier may be based on default block parameters, based on user input, based on an analysis of Model X, etc. A sample time identifier, associated with a block, may include information that identifies a proposed sample time for the block. For the purposes of example implementation 400, assume that a sample time identifier of 0 corresponds to a continuous sample time, that a sample time identifier of inf corresponds to the parameter sample time, and that a sample time identifier of −1 corresponds to an inherited sample time. As shown, Sine1 may be associated with the continuous sample time identifier (e.g., Sine1=0), SumA may be associated with the inherited sample time identifier (e.g., SumA=−1), Constant1 may be associated with the parameter sample time (e.g., Constant1=inf), SumB may be associated with the inherited sample time identifier (e.g., SumB=−1), Constant2 may be associated with the parameter sample time (e.g., Constant2=inf), Out1 may be associated with the inherited sample time identifier (e.g., Out1=−1), Lookup1 may be associated with the inherited sample time identifier (e.g., Lookup1=−1), and Scope1 may be associated with the inherited sample time identifier (e.g., Scope1=−1). As shown by reference number 415, TCE 220 may receive a command to execute Model X (e.g., based on the user selecting an Execute menu item associated with TCE 220). In some implementations, the information that identifies sample times for the blocks may include additional and/or different information, such as a period (e.g., a time interval at which updates occur during simulation), an offset, (e.g., at interval indicating an update delay), or the like.

Figure 4B:
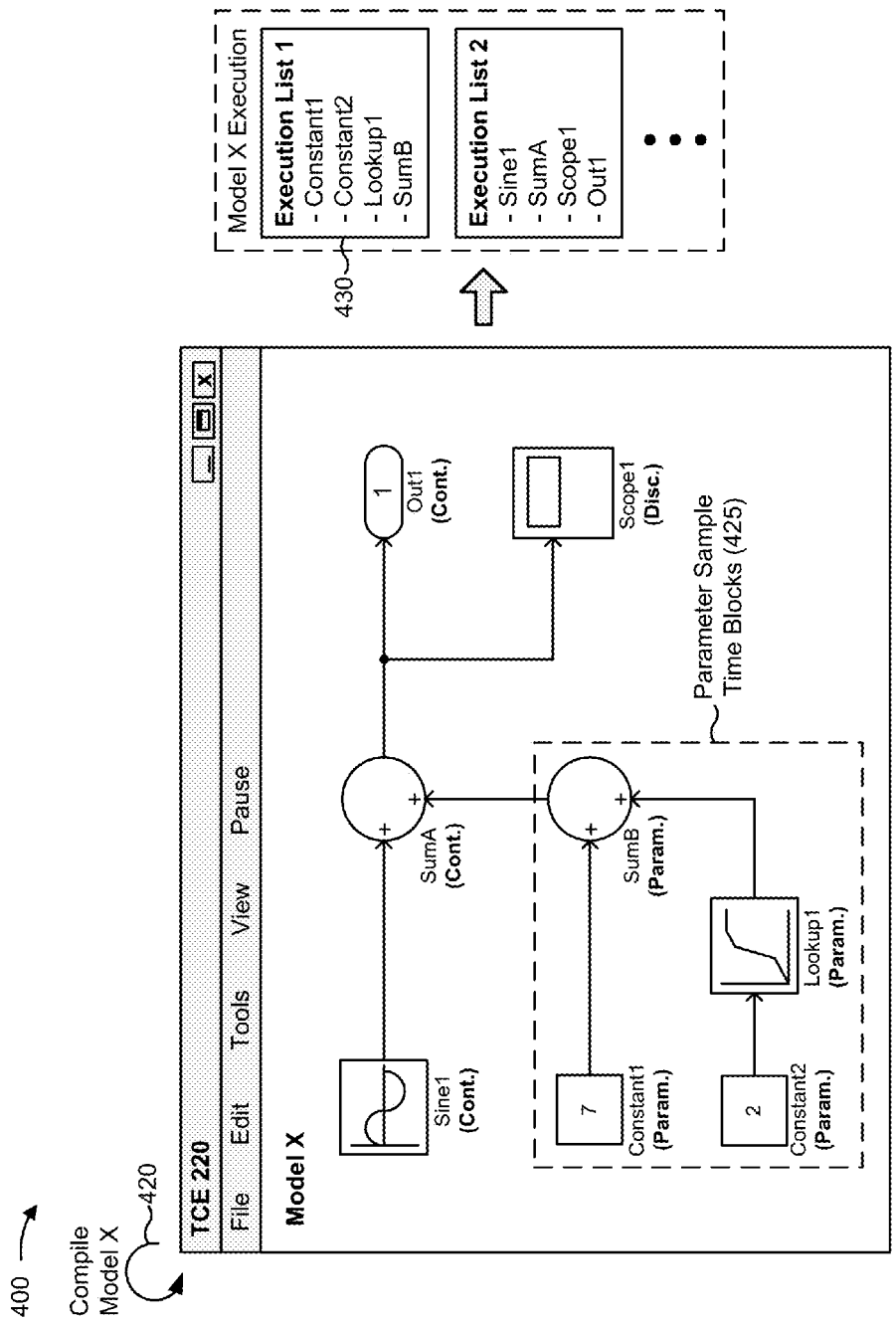

As shown in FIG. 4B, and by reference number 420, TCE 220 may compile Model X based on receiving the command to execute Model X. As shown, TCE 220 may assign sample times to each of the blocks of Model X during compilation of the model. For example, sample times may be assigned based on sample time propagation rules associated with TCE 220 and/or based on rules associated with assigning each sample time. As shown, TCE 220 may assign the continuous sample time to Sine1, SumA, and Out1. As further shown, TCE 220 may assign a discrete sample time to Scope1 (e.g., when Scope1 is configured such that Scope1 may inherit a discrete sample time instead of a continuous sample time). As yet shown, TCE 220 may assign the parameter sample time to Constant1, Constant2, Lookup1, and SumB. As shown by reference number 425, compiling the model may further include identifying a set of parameter sample time blocks included in the model. As shown, TCE 220 may identify the group of connected blocks that includes Constant1, Constant2, Lookup1, and SumB.

As shown by reference number 430, compiling the model may further include generating execution lists associated with executing Model X. An execution list may include a list, a table etc. of blocks included in the model that describes a schedule of the order of execution of the blocks. As shown, TCE 220 may generate a first execution list, Execution List 1, that includes the group of parameter sample time blocks, and may generate a second execution list, Execution list 2, that includes the group of blocks that was not assigned the parameter sample time.

Figure 4C:
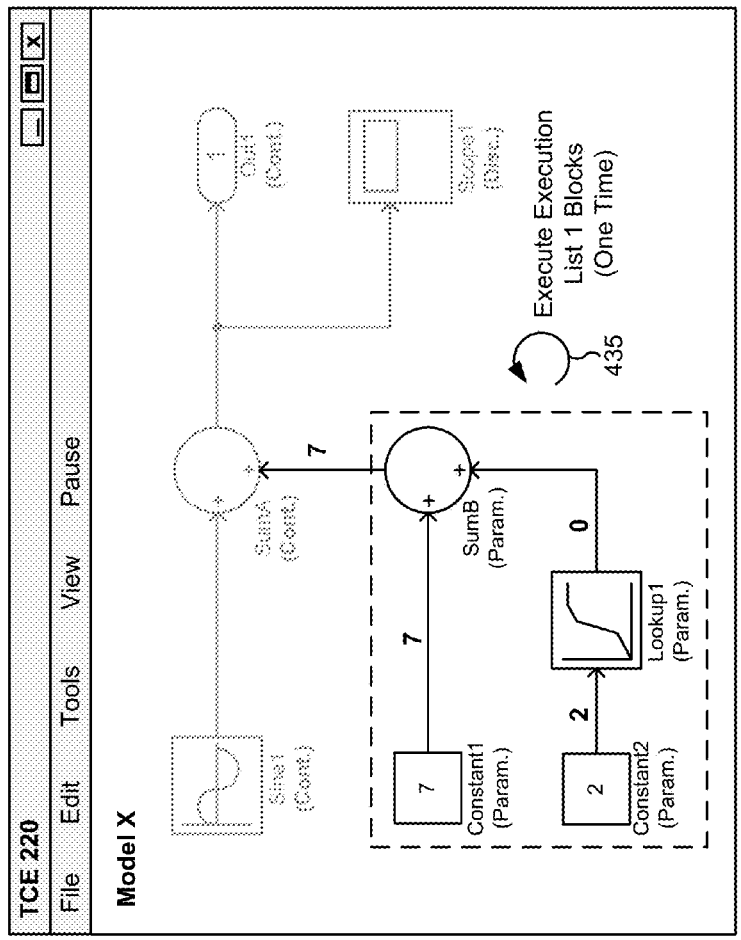

As shown in FIG. 4C, and by reference number 435, TCE 220 may proceed with executing Model X by executing the parameter sample time blocks included in Execution List 1 (e.g., Constant1, Constant2, Lookup1, and SumB) one time. As shown, Constant1 may output a value of 7 to Sum B. As further shown, Constant2 may output a value of 2 to Lookup1, Lookup1 may receive the output value from Constant2, and may provide an output of 0 to SumB. For example, the output value from Constant2 may be based on implementing a lookup table included in Lookup1 and assuming that an input value of 2 results in an output value of 0. As further shown, SumB may receive the value of 7 from Constant1 and the value of 0 from Lookup1, and may provide an output of 7 to SumA. In the embodiment of FIG. 4C, the parameter sample time blocks of Model X have only been executed once by TCE 220.

Figure 4D:
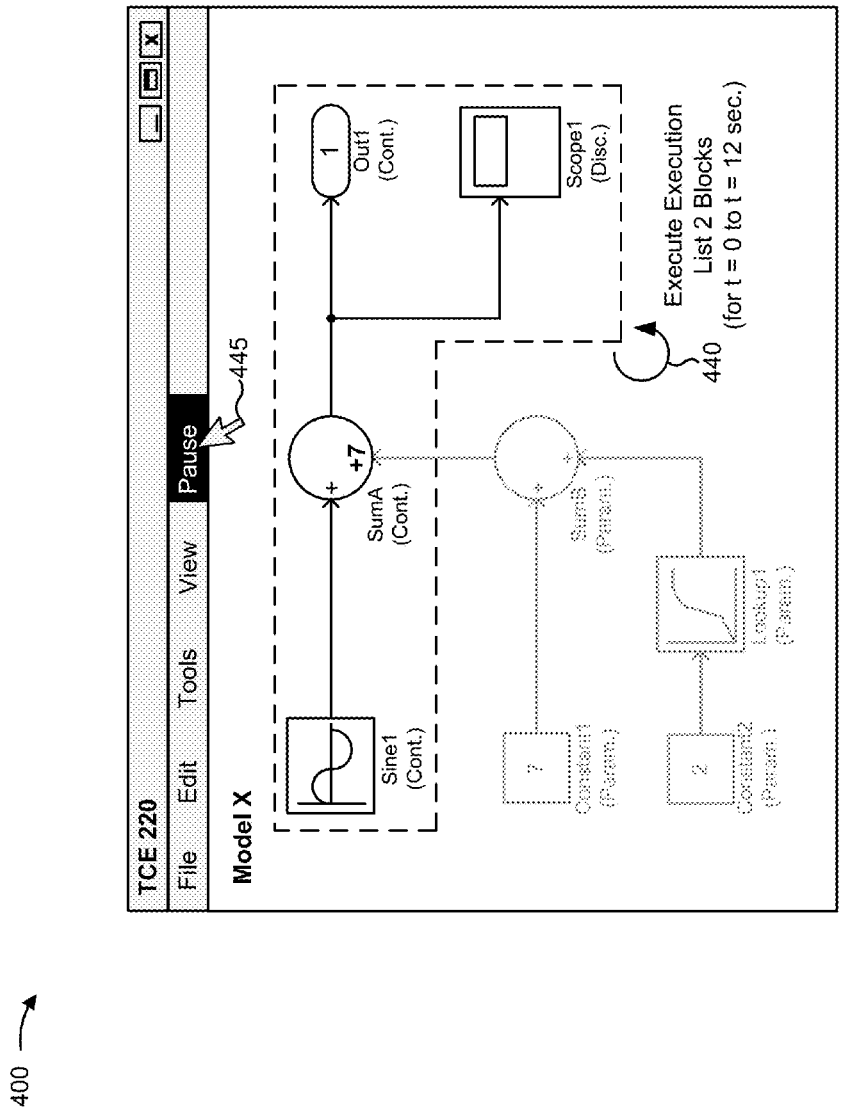

As shown in FIG. 4D, and by reference number 440, TCE 220 may proceed with executing the blocks included in Execution List 2 (e.g., Sine1, SumA, Out1, Scope1) after executing the group of parameter sample time blocks. As shown, assume that the blocks included in Execution List 2 are repeatedly executed as Model X is executed for twelve seconds (e.g., from t=0 to t=12). For example, the blocks included in Execution List 2 may be executed several times based on a sample time of Model X, such as a discrete sample time. For example, if the sample time of Model X is 0.05 seconds, then the blocks of Execution List 2 would execute 24 times if Model X is executed for 120 seconds before being paused. A user may pause execution of Model X when, as shown by reference number 445, the user selects a Pause menu item.

Figure 4E:
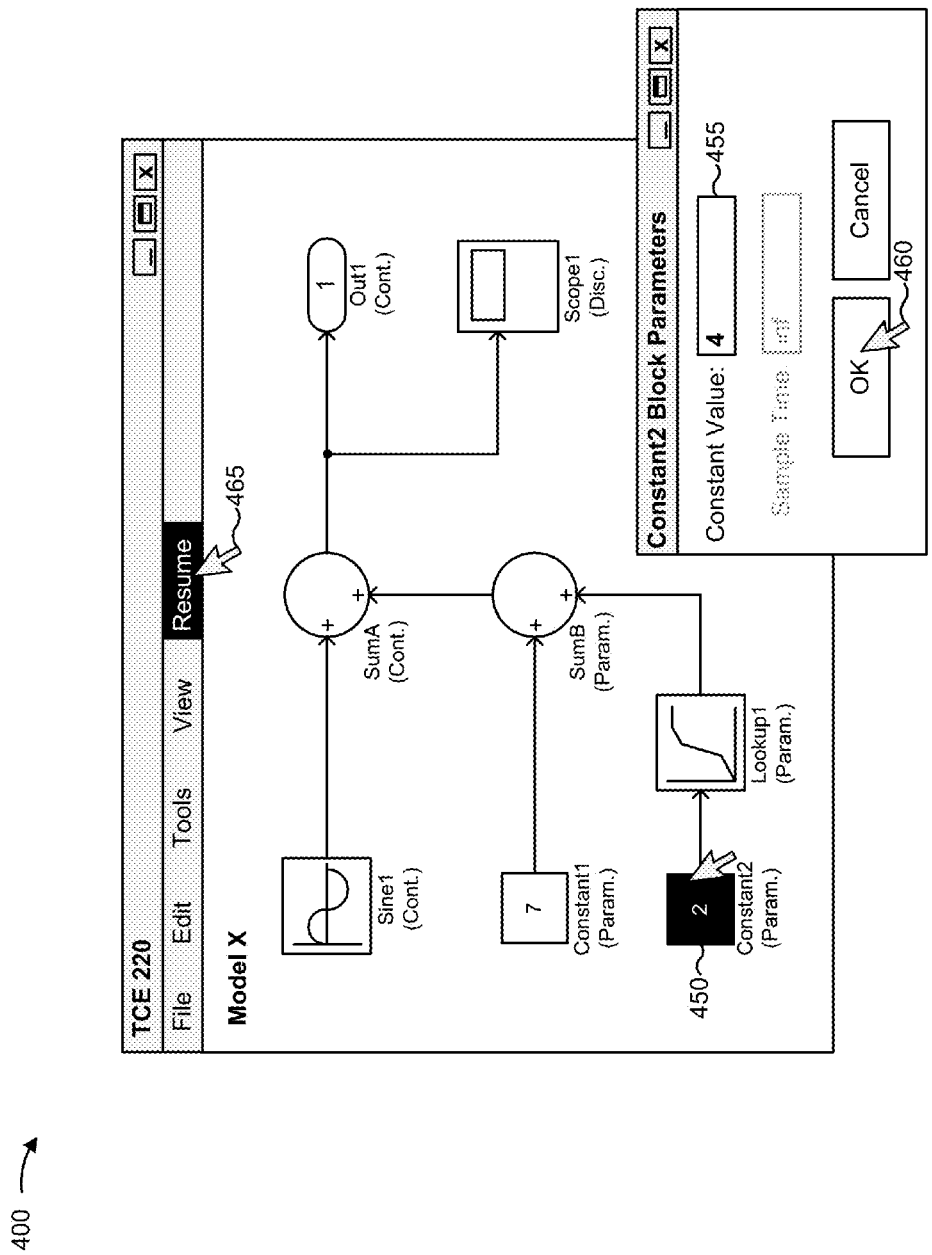

As shown in FIG. 4E, and by reference number 450, the user may indicate (e.g., by double clicking Constant2) that the user wishes to modify a parameter of Constant2. As shown by reference number 455, TCE 220 may display a dialog box, associated with Constant2, and the user may modify the constant value parameter of Constant2 such that the new constant value of Constant2 is 4 (e.g., rather than 2). As shown by reference number 460, the user may indicate (e.g., by selecting and OK button) that the parameter is to be modified as indicated.

TCE 220 may detect, based on the parameter being modified, a parameter change event. A parameter change event, associated with the model, may include an externally created event that, when detected, may cause a block (e.g., a parameter sample time block) to be re-executed. An externally created event may include an event that occurs outside of a model. For example, a user may initiate an action (e.g., via an input device of user device 210) via an input element (e.g., a button, a menu item, etc.), associated with TCE 220, and the user initiated action may be an externally created event that causes the block to be re-executed. As another example, a function, associated with TCE 220, may be configured to poll a memory location, and the polling of the memory location may be an externally created event that triggers (e.g., based on detecting a particular value, a particular condition, etc. associated with the memory location) the block to be re-executed. As shown by reference number 465 and after detecting the parameter change event associated with Constant2, TCE 220 may receive user input (e.g., via a Resume menu item) that the execution of Model X is to resume.

Figure 4F:
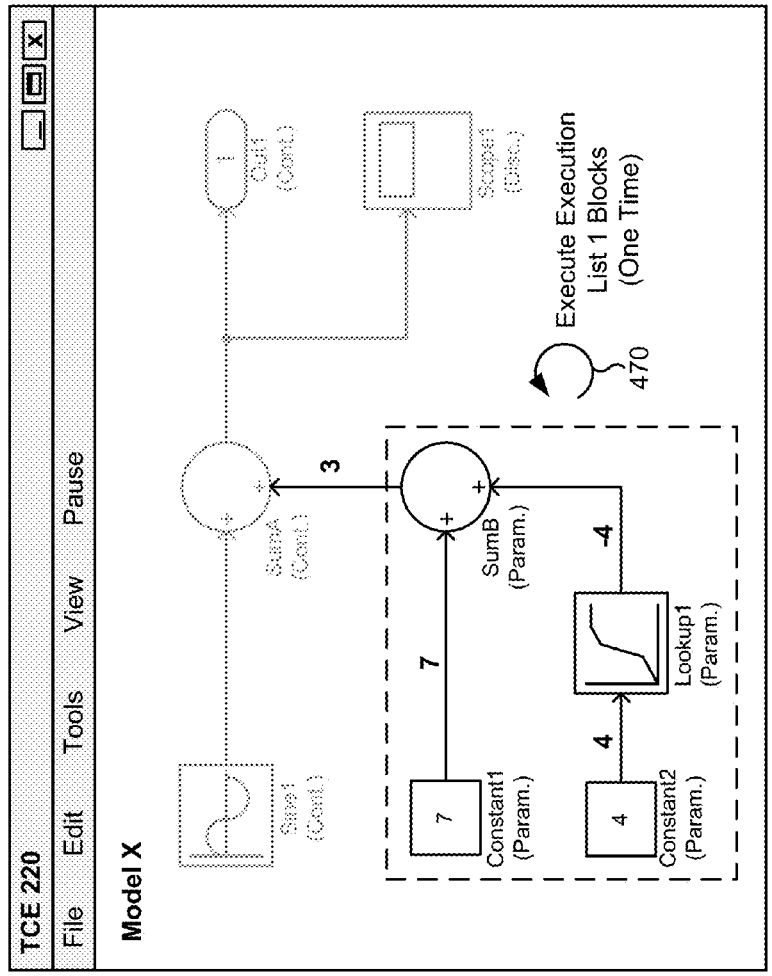

As shown in FIG. 4F, and by reference number 470, TCE 220 may determine Execution List 1 (e.g., that includes the parameter sample time blocks) based on receiving the indication to resume the execution of Model X, and as shown, may re-execute each of the parameter sample time blocks included in Execution List 1 (e.g., one time). Additionally, or alternatively, each of the parameter sample time blocks included in Execution List 1 may (e.g., automatically) re-execute (e.g., one time) when TCE 220 detects the parameter change event. As shown, Constant1, when re-executed, may output a value of 7 to Sum B. As further shown, Constant2 may output a value of 4 to Lookup 1, Lookup1 may receive the output value from Constant2, and may provide an output of −4 to SumB (e.g., based on implementing the lookup table included in Lookup1 and assuming that an input value of 4 results in an output value of −4). As further shown, SumB may receive the value of 7 from Constant1 and the value of −4 from Lookup1, and may provide an output of 3 to SumA.

Figure 4G:
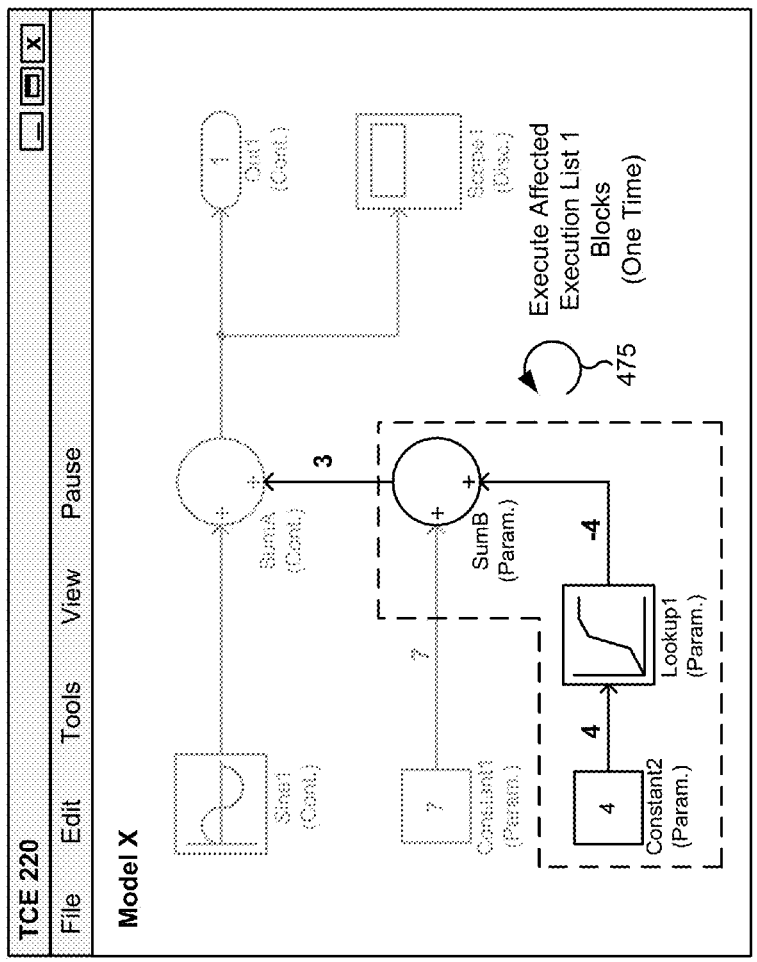

FIG. 4G illustrates an alternative to FIG. 4F. As shown in FIG. 4G, and by reference number 475, TCE 220 may determine Execution List 1 (e.g., that includes the parameter sample time blocks) based on receiving the indication to resume the execution of Model X, and as shown, may re-execute only those blocks that are affected by the parameter change event. Re-executing only those blocks that are affected by the parameter change event may be referred to as adaptive re-execution. In other words, TCE 220 may not re-execute blocks unaffected by the parameter change event (e.g., Constant1). As shown, Constant2, when re-executed, may output a value of 4 to Lookup 1, Lookup1 may receive the output value from Constant2, and may provide an output of −4 to SumB (e.g., based on implementing the lookup table included in Lookup1). As further shown, SumB may determine (e.g., based on information stored by TCE 220) the value of 7 from Constant1 and may receive the value of −4 from Lookup1, and may provide an output of 3 to SumA. Notably, in this alternative, TCE 220 applies adaptive re-execution by only executing parameter sample time blocks that are affected by the parameter change event (e.g., Constant2, Lookup1, and SumB) rather than all of the parameter sample time blocks.

Figure 4H:
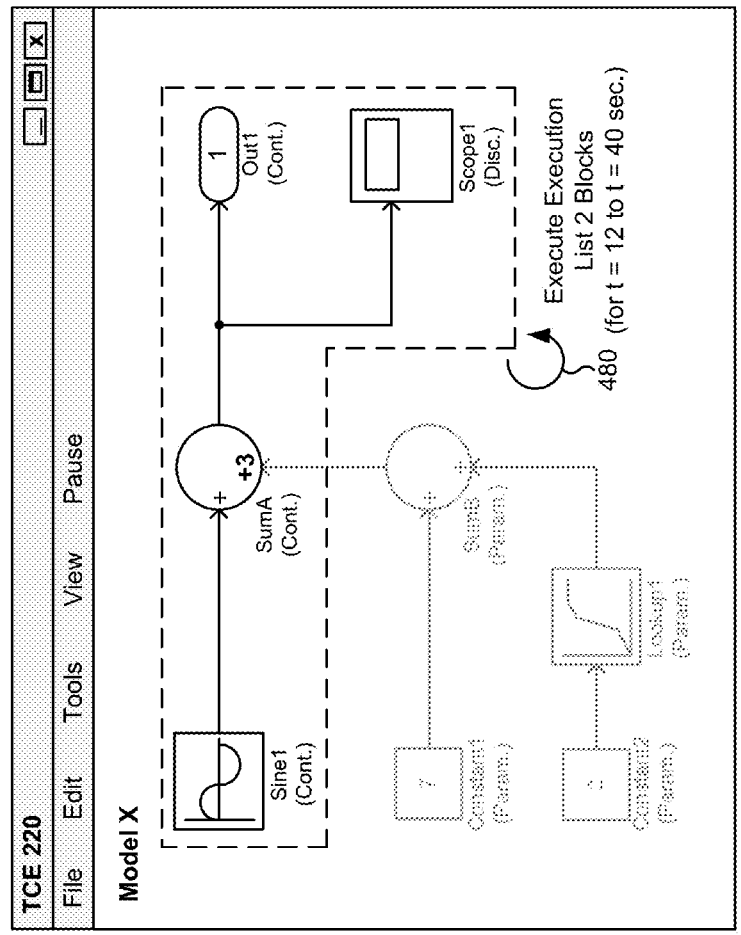

As shown in FIG. 4H, and by reference number 480, TCE 220 may proceed with executing the blocks included in Execution List 2 (e.g., Sine1, SumA, Out1, Scope1) after re-executing the group of parameter sample time blocks. As shown, assume that the blocks included in Execution List 2 are repeatedly executed as Model X is executed for another twenty-eight seconds (e.g., from t=12 to t=40). Assume that the model execution is complete after forty seconds, and that TCE 220 did not detect another parameter change event during the final twenty-eight seconds during which Model X was executed.

Figure 4I:
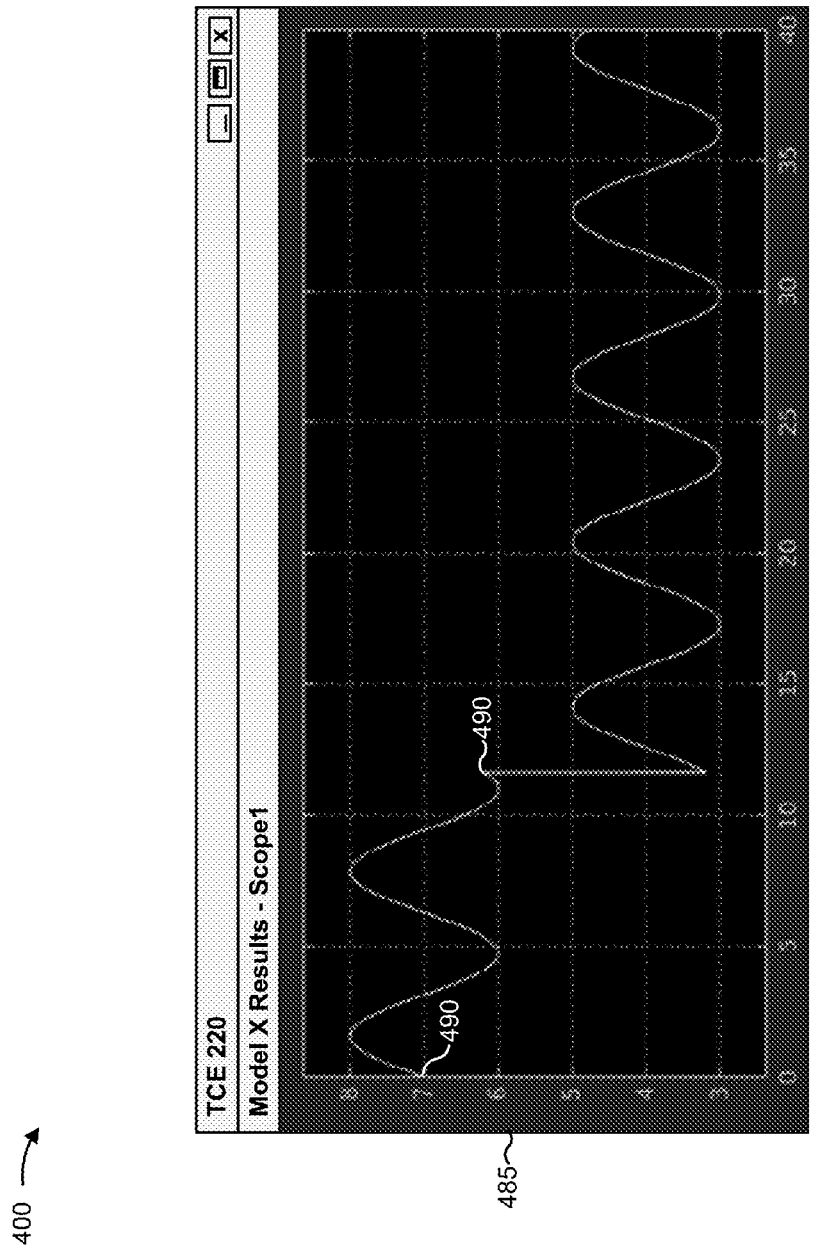

As shown in FIG. 4I, and by reference number 485, TCE 220 may provide, via a user interface associated with Scope1, a result (e.g., a graph) associated with executing Model X. As indicated by reference number 490, the parameter sample time blocks of Model X may be executed only twice during the execution of Model X: one time during the initialization phase of the execution of Model X, and one time based on the parameter change event detected by TCE 220 12 seconds after the execution of Model X began. In this way (e.g., by implementing a parameter sample time within TCE 220), an un-modeled event (e.g., an externally created event) may be detected during an execution of a model, one or more blocks, included in the model, may be re-executed in response to the un-modeled event, and the execution of the model may continue after the one or more blocks are re-executed.

As indicated above, FIGS. 4A-4I are provided merely as an example. Other examples are possible and may differ from what was described with regard to FIGS. 4A-4I.

Figure 5A:
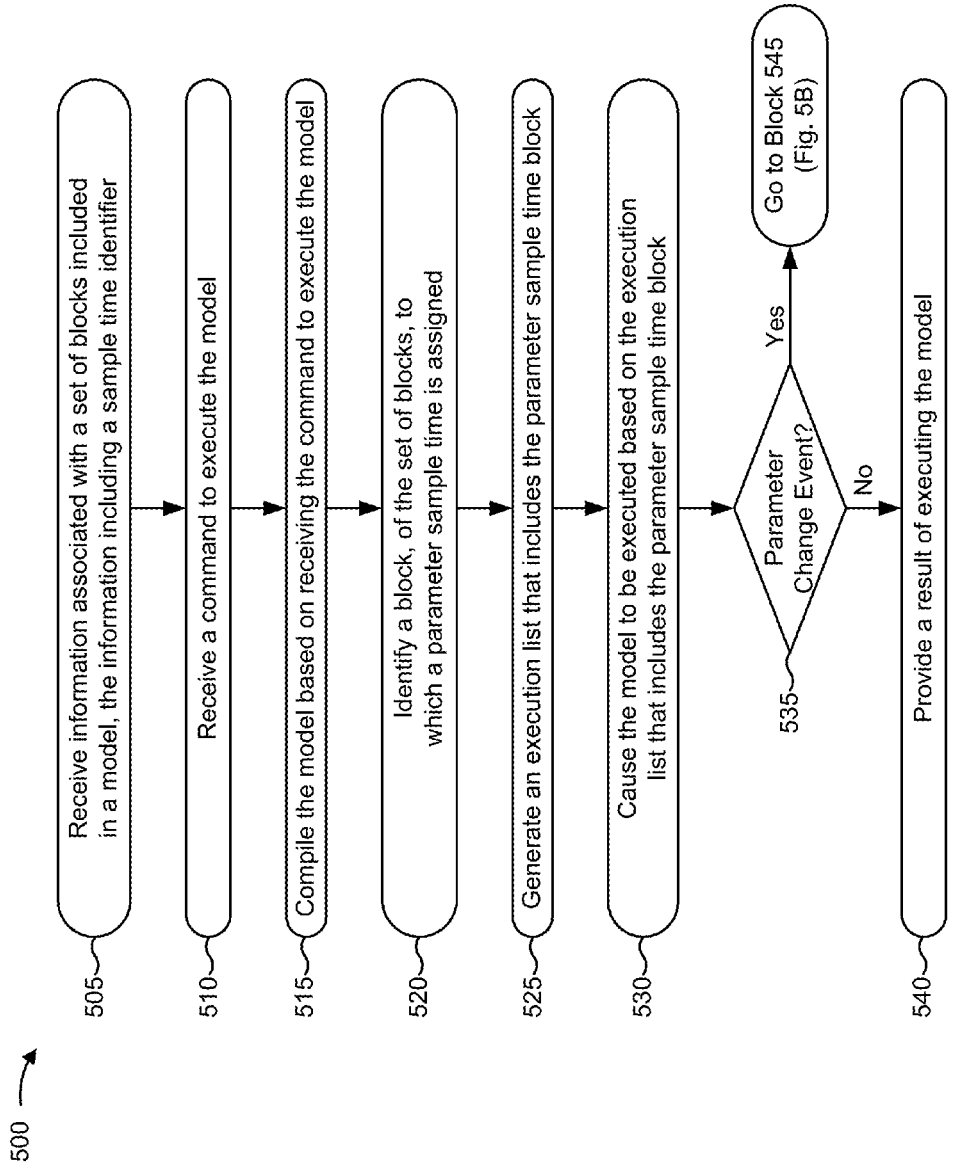
FIGS. 5A and 5B are flow charts of an example process for detecting an un-modeled event during an execution of a model, causing one or more blocks, included in the model, to be re-executed in response to the un-modeled event, and continuing the execution of the model after causing the one or more blocks to be re-executed.
Figure 5B:
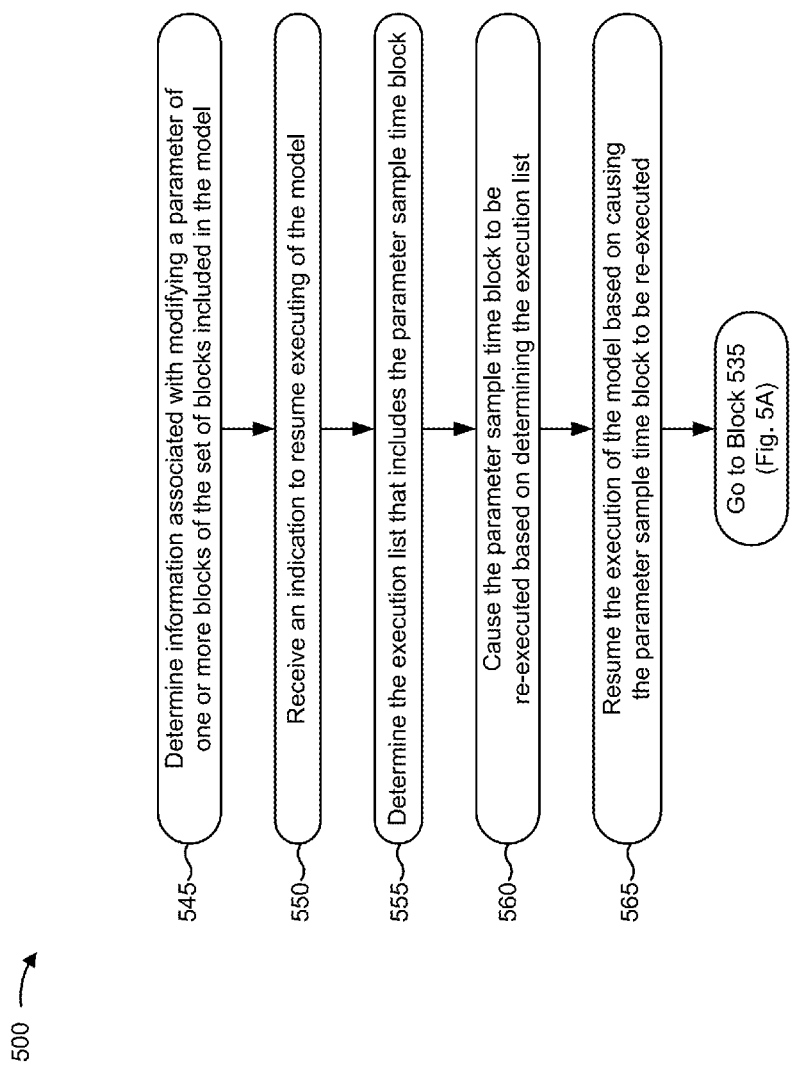

FIGS. 5A and 5B are flow charts of an example process 500 for detecting an un-modeled event during an execution of a model, causing one or more blocks, included in the model, to be re-executed in response to the un-modeled event, and continuing the execution of the model after causing the one or more blocks to be re-executed. In some implementations, one or more process blocks of FIG. 5 may be performed by client device 210. In some implementations, one or more process blocks of FIG. 5 may be performed by another device or a group of devices separate from or including client device 210, such as server device 230. While the processes and/or methods described in process 500 are described in terms of an externally created event in the form of a user modifying a parameter, associated with a block, during model execution, these processes and/or methods may equally apply to another type of externally created event.

As shown in FIG. 5A, process 500 may include receiving information associated with a set of blocks included in a model, the information including a sample time identifier (block 505). For example, a user may cause client device 210 (e.g., TCE 220) to create or open a user interface. The user interface (e.g., a model canvas) may not include any blocks. The user may then add the set of blocks to the user interface. For example, in some implementations, client device 210 may receive a command, from the user, that indicates that a block is to be added to the user interface. Client device 210 may receive the command based, for example, on detecting a selection of a particular menu item, entry of a particular textual or audible input from the user, and/or entry of some other predetermined input that indicates a desire to add a block to the user interface. As another example, client device 210 may receive input (e.g., a drag and drop) that indicates that a block, included in a block library associated with TCE 220, is to be added to the user interface. Based on the command, client device 210 may add the block to the user interface. For example, client device 210 may add the block to a block diagram model represented via the user interface.

Additionally, or alternatively, client device 210 may receive a request, from a user of client device 210, to access the model that includes the set of blocks. The request may include information identifying the model, such as a name of the model, and information identifying a memory location at which the model is stored. The memory location may be located within client device 210 or external to, and possibly remote from, client device 210. Client device 210 may, based on receiving the request, retrieve the model from the memory location. In some implementations, client device 210 may provide, for display, a user interface that depicts all or a portion of the set of blocks included in the model.

In some implementations, client device 210 may determine a sample time identifier associated with each block of the set of blocks (e.g., as shown by reference numbers 405 and 410 of FIG. 4A). For example, client device 210 may receive, from the user, input associated with a sample time identifier corresponding to a block included in the model, and client device 210 may determine the sample time identifier based on the user input. As another example, client device 210 may determine the sample time identifier based on a default sample time identifier associated with the block (e.g., when client device 210 stores information associated with the default sample time identifier). As yet another example, client device 210 may determine the sample time identifier based on information stored by client device 210 (e.g., when client device 210 loads the model from memory and the model includes information associated with sample time identifiers of blocks included in the model). As still another example, client device 210 may determine the sample time identifier based on retrieving the sample time identifier from a remote source, such as server device 230. As a final example, client device 210 may determine the sample time identifier based on analyzing the model and specifying a sample time identifier for the block. In this example, client device 210 may permit the user to modify the sample time identifier.

A sample time identifier, associated with a block, may include information that identifies a proposed sample time for the block. The sample time identifier may identify a proposed sample time since the block may be assigned a different sample time during sample time assignment, as discussed below. For example, the sample time identifier may include information that identifies a continuous sample time (e.g., indicating that the block is to produce an output at each major and/or minor time step during execution of the model), a discrete sample time (e.g., indicating that the block is to produce an output at particular intervals of time during model execution), a constant sample time (e.g., indicating that the block is to produce an output one time at the start of the model execution), a parameter sample time (e.g., indicating that the block is to produce an output once at the start of the execution of the model and in response to an externally created event that occurs during the model execution), an inherited sample time (e.g., indicating that the sample time of the block is to be inherited from another block included in the model), and/or another type of sample time.

As further shown in FIG. 5A, process 500 may include receiving a command to execute the model (block 510). For example, client device 210 (e.g., TCE 220) may receive a command, from the user, to execute the model including the set of blocks. In some implementations, client device 210 may receive the command based on detecting a selection of a particular menu item (e.g., as shown by reference number 415 of FIG. 4A), entry of a particular textual or audible input from the user, and/or entry of some other predetermined input that identifies the desire to analyze or execute the model.

As further shown in FIG. 5A, process 500 may include compiling the model based on receiving the command to execute the model (block 515). For example, client device 210 (e.g., TCE 220) may compile the model based on receiving the command to execute the model (e.g., as shown by reference number 420 of FIG. 4B). In some implementations, compiling the model may include determining a manner in which the set of blocks, included in the model, are connected (e.g., which outputs are connected to which inputs), determining characteristics associated with connections and/or blocks included in the model (e.g., a data type, a dimensionality, a complexity, etc.), assigning memory locations to particular blocks and/or connections, and/or designating an order in which the set of blocks are going to be executed (e.g., scheduling the model based on semantic rules, such as a synchronous data flow rule, a dynamic data flow rule, a Boolean data flow rule, a Kahn process network rule, a Petri net rule, a discrete event system rule, etc.). Additionally, or alternatively, compiling the model may include generating one or more execution lists associated with the model, determining computations that are actually going to be executed, determining a buffer allocation and/or allocating buffer space associated with model execution (e.g., determining and/or allocating a number and/or size of data buffers for the blocks and/or connections), determining time delays associated with the set of blocks, determining memory consumption and/or memory accesses associated with the set of blocks, and/or determining other information relating to size, performance, or ordering of the set of blocks included in the model.

In some implementations, compiling the model may include assigning a sample time to at least one block (e.g., each block) included in the model. For example, client device 210 may assign a sample time to each block of the set of blocks included in the model. In some implementations, client device 210 may assign the sample times based on sample time propagation rules associated with TCE 220. For example, client device 210 may implement a set of propagation rules associated with TCE 220 in order to assign a sample time to each block included in the model. In some implementations, a block may be assigned a sample time that corresponds to the sample time identifier associated with the block. Alternatively, the block may be assigned a sample time different than the sample time that corresponds to the sample time identifier (e.g., when the propagation rules cause the different sample time to be assigned to the block).

As discussed above, client device 210 may assign the parameter sample time to one or more of the blocks included in the model. In some implementations, a set of parameter sample time rules, stored by client device 210, may govern whether a block may be assigned the parameter sample time. For example, a first parameter sample time rule may indicate that the block is to be assigned the parameter sample time if the block would be assigned a constant sample time (e.g., when the use of the parameter sample time is implemented to replace the use of the constant sample time). Similarly, a second parameter sample time rule may indicate that the block is to be assigned the parameter sample time when the block would have been assigned the constant sample but for the block (or another block that dictates the sample time of the block) being configured to allow for tunable parameters. A third parameter sample time rule may indicate that the block may not be assigned the parameter sample time if the block drives a subsystem control port (e.g., an enabled subsystem, a triggered subsystem, etc.). A fourth parameter sample time rule may indicate that the block may not be assigned the parameter sample time if the block includes an update method. Alternatively, the block may be assigned the parameter sample time if the block includes an update method, but may indicate that the update method of the block may not be executed during model execution. A fifth parameter sample time rule may indicate that the block may be assigned the parameter sample time even if the block is included in a conditionally executed subsystem (e.g., conditionally executed subsystem boundaries may be ignored). Additionally, or alternatively, the block may be assigned the parameter sample time based on another rule.

In some implementations, client device 210 may assign sample times to each of the blocks included in the model, and client device 210 may update a display, associated with the model, based on the assigned sample times. For example, client device 210 may assign the sample times to each of the blocks included in the model, and client device 210 may update a display, associated with model, based on a color scheme that corresponds to the assigned sample times (e.g., when blocks assigned the parameter sample time may be displayed in a particular color corresponding to the parameter sample time). In some implementations, client device 210 may update the display to indicate the sample times using a form of visualization of than a color scheme, such as a gray-scale scheme, a labeling scheme, a hatching scheme, or the like.

Additionally, or alternatively, compiling the model may include assigning blocks to computational resources for execution and/or setting a rate at which blocks in the model are to execute. Additionally, or alternatively, compiling the model may include determining static scheduling information associated with the model. For example, client device 210 may analyze the model (e.g., based on rate monotonic scheduling (RMS), based on output dependencies associated with the model) in order to determine static scheduling information associated with the model. In some implementations, the static scheduling information may be used, during execution of the model, in order to determine an order associated with re-executing the one or more parameter sample time blocks. Additionally, or alternatively, compiling the model may include generating program code for executing the model. The program code may include program code describing the set of blocks included in the model. Additionally, or alternatively, the program code may include instructions for multi-rate execution (e.g., with different blocks being executed at different rates) and/or multi-task execution (e.g., with different blocks being executed using different computational resources) of the model. In some implementations, client device 210 may store the program code for later execution.

In some implementations, for program code generated from the model, different workflows and target environments may have different requirements for the parameter sample time. As one example, if the target environment (e.g., a simulation target such as the Simulink Accelerator) supports a new model level entry point for the parameter sample time, then such an entry point may be generated and TCE 220 may call the entry point appropriately in response to an externally created event. In this context, appropriately may be defined as scheduling the call inside the execution context of downstream blocks that use a result as input (e.g., in order to avoid data corruption). This may require multiple entry points to be created when there are multiple consumer threads.

An alternative for the generated code may be to generate the separate entry point function for blocks with the parameter sample time even if the target environment does not support a new model level entry point for the parameter sample time, and (a) ensure that the entry point is called by calling the entry point from a method to compute output values of model blocks (e.g., an output method) for the base rate of the model with an appropriate guard, and (b) adding rate transition protection code to guard data passing between outputs of the blocks with the parameter sample time and input of blocks with other sample times.

As another example, if the workflow is primarily concerned with a performance metric, such as CPU throughput, and does not need to tune parameters of the model after the model begins to be executed, then the program code for blocks with the parameter sample time may be generated into the start method of the model. Similarly, the program code for blocks with the parameter sample time may be generated into the start method when a parameter referenced by the parameter sample time blocks is not to be modified during the execution of the model (e.g., when the parameter is defined as being non-tunable after the execution of the model has begun, as described below). In some implementations, TCE 220 may determine (e.g., based on user input) that all parameters referenced by one or more of the parameter sample time blocks are not to be modified during the execution of the model (e.g., on a global basis). Additionally, or alternatively, TCE 220 may determine that one or more particular parameters, referenced by one or more of the parameter sample time blocks, are not to be modified during the execution of the model (e.g., on a local basis).

As yet another example, the program code for blocks with the parameter sample time may be generated into an output method at the rate of blocks that are downstream from the blocks with the parameter sample time. In this situation, care may be needed to ensure that the parameter value changes caused by the externally created event happen synchronously with the execution of the program code that reads the values (e.g., in order to prevent data corruption).

In some implementations, the manner in which the program code for the parameter sample time blocks is generated may be based on a performance metric prioritization associated with generating the program code. For example, the user may indicate (e.g., via a code generation optimization tool associated with TCE 220), that minimizing RAM usage is a higher priority than maximizing CPU throughput when executing program code generated based on the model. In this example, TCE 220 may determine that the program code for the parameter sample time blocks is to be generated into the output method of blocks that are downstream from the parameter sample time blocks (e.g., to decrease RAM usage during execution of the program code). As another example, the user may indicate that maximizing CPU throughput is a higher priority than minimizing RAM usage when executing code generated based on the model. In this example, TCE 220 may determine that the program code for the parameter sample time blocks is to be generated into the start method of the model (e.g., to increase CPU throughput).

Additionally, or alternatively, the program code for the parameter sample time blocks may be generated based on applying constant folding to two or more connected parameter sample time blocks. For example, assume that, during code generation, TCE 220 determines, based on parameter definitions corresponding to one or more parameters referenced by two or more connected parameter sample time blocks, that the one or more parameters are not tunable (e.g., that the one or more parameters may not be modified). In this example, TCE 220 may compute an output of the two or more connected parameter sample time blocks during code generation associated with the two or more connected blocks, and may store the output (e.g., in a data structure associated with constant block outputs for the model) such that the output may be referenced in program code generated for the model. In this way, the program code for the model may be generated such that the output of the two or more connected parameter sample time blocks may be statically represented in the program code (e.g., such that no program code needs to be executed in order to determine the output of the two or more connected parameter sample time blocks).

Additionally, or alternatively, compiling the model may include identifying a block, of the set of blocks, to which that parameter sample time has been assigned (herein referred to as a parameter sample time block), and/or may include generating an execution list that includes the block, as discussed below with regard to blocks 520 and 525, respectively.

As further shown in FIG. 5A, process 500 may include identifying a block, of the set of blocks, to which a parameter sample time is assigned (block 520). For example, client device 210 (e.g., TCE 220) may identify a block, of the set of blocks, to which the parameter sample time is assigned. In some implementations, client device 210 may identify the parameter sample time block when client device 210 compiles the model. Additionally, or alternatively, client device 210 may identify the parameter sample time block when client device 210 assigns sample times to each block of the set of blocks.

In some implementations, client device 210 may identify the parameter sample time block based on assigning the parameter sample time to the block in the manner discussed above. In some implementations, client device 210 may identify multiple parameter sample time blocks. Additionally, or alternatively, client device 210 may identify a group of connected parameter sample time blocks, an example of which is described above with reference number 425 in FIG. 4B. Additionally, or alternatively, client device 210 may identify multiple groups of connected parameter sample time blocks (e.g., a first group of connected parameter sample time blocks and a second group of connected parameter sample time blocks). For example, with reference to reference number 425 of FIG. 4B, Constant1, Constant2, Lookup1, and SumB have been identified as a group of connected blocks to which the parameter sample time has been assigned.

As further shown in FIG. 5A, process 500 may include generating an execution list that includes the parameter sample time block (block 525). For example, client device 210 (e.g., TCE 220) may generate an execution list that includes the parameter sample time block, as shown by reference number 430. In some implementations, client device 210 may generate the execution list when client device 210 compiles the model. Additionally, or alternatively, client device 210 may generate the execution list after client device 210 identifies the parameter sample time block.

An execution list may include a list, a table etc. of blocks included in the model that describes an order in which the blocks are to execute. In some implementations, client device 210 may generate one or more execution lists, associated with the model, based on the sample times to which the blocks of the model are assigned. For example, client device 210 may generate a first execution list that includes the parameter sample time block (e.g., or a group of parameter sample time blocks), and may create a second execution list that includes a group of blocks to which one or more other sample times are assigned (e.g., a discrete sample time, a continuous sample time, etc.).

With regard to the execution list that includes the parameter sample time block, in some implementations, client device 210 may generate the execution list such that the execution list includes multiple parameter sample time blocks. For example, client device 210 may generate an execution list that includes all parameter sample time blocks included in the model (e.g., a single execution list that includes all parameter sample time blocks, regardless of grouping). Additionally, or alternatively, client device 210 may generate multiple execution lists, where each execution list includes a different parameter sample time block and/or different group of parameter sample time blocks. For example, client device 210 may identify a first group of connected parameter sample time blocks, and a second group of parameter sample time blocks. In this example, client device 210 may generate a first execution list that includes the first group of connected parameter sample time blocks, and may generate a second execution list that includes the second group of connected parameter sample time blocks.

As further shown in FIG. 5A, process 500 may include causing the model to be executed based on the execution list that includes the parameter sample time block (block 530). For example, client device 210 (e.g., TCE 220) may cause the model to be executed based on the execution list that includes the parameter sample time block, as shown by reference numbers 435 and 440. In some implementations, client device 210 may cause the model to be executed after client device 210 compiles the model. Additionally, or alternatively, client device 210 may cause the model to be executed after client device 210 generates the execution list that includes the parameter sample time block.

In some implementations, client device 210 may cause the parameter sample time block to be executed first when causing the model to be executed. For example, client device 210 may generate an execution list that includes a group of parameter sample time blocks. In this example, client device 210 may cause the parameter sample time blocks, included in the execution list, to be executed first during an initialization phase of the model execution and before other blocks included in other execution lists are executed. In this example, client device 210 may execute the group of parameter sample time blocks one time before proceeding with (e.g., repeatedly) executing the other blocks. In other words, client device 210 may cause parameter sample time blocks, included in the model, to be executed once before other blocks included in the model are executed.

As further shown in FIG. 5A, process 500 may include detecting whether a parameter change event, associated with the model, occurs during the execution of the model (block 535). For example, client device 210 (e.g., TCE 220) may detect whether a parameter change event, associated with the model, occurs during the execution of the model. For example, in example implementation 400 described above, TCE 220 may detect the occurrence of a parameter change event, associated with Model X, during the execution of Model X. In some implementations, client device 210 may detect whether the parameter change event occurs while client device 210 is causing the model to be executed. Additionally, or alternatively, client device 210 may detect whether the parameter change event occurs after client device 210 causes the parameter sample time block to be executed.

A parameter change event, associated with the model, may include an un-modeled event (e.g., an externally created event) that, when detected, may cause a block (e.g., a parameter sample time block) to be re-executed. For example, the parameter change event may include an event associated with a programmatic instruction, a programmatic event, and/or or user initiated input received by TCE 220 that causes TCE 220 to modify, alter, update, etc. a parameter of one or more blocks in response to the event. As another example, the parameter change event may include a user interaction (e.g., opening a dialog box and modifying a parameter of a block, interacting with an HMI associated with the model, etc.) that causes a parameter of one or more blocks to be modified. In these examples, client device 210 may detect that a parameter change event has occurred based on detecting that the parameter of the one or more blocks has been modified. In some implementations, the externally created event may include an event other than a parameter change event, such as another type of event that may be detected by client device 210 (e.g., an event based on a user interaction, an event that occurs without any input from the user, etc.). In some implementations, client device 210 may pause and/or suspend execution of the model based on detecting the parameter change event. Additionally, or alternatively, the user may pause and/or suspend the execution of the model before client device 210 detects the parameter change event. Alternatively, the execution of the model may not be paused upon detection of the parameter change event (e.g., the execution of the model may continue without pausing the model).

In some implementations, client device 210 may detect the parameter change event based on a user interaction. For example, client device 210 may cause the model execution to begin, and client device 210 may pause the execution of the model based on input from the user (e.g., a selection of a particular menu item, a click of a button, etc.). The user may then modify (e.g., via a dialog box associated with a block) a parameter associated with a block. Client device 210 may detect the parameter change event based on the user modifying the parameter of the block. Additionally, or alternatively, client device 210 may detect the parameter change event based on a programmatic instruction, a programmatic event, user initiated input, etc. that causes TCE 220 to modify the parameter of the block. In some implementations, the parameter change event may be associated with a parameter sample time block. Additionally, or alternatively, the parameter change event may be associated with another block. For example, the user may modify a parameter of a first block (to which the parameter sample time is assigned), and may also modify a parameter of a second block (to which another type of sample time is assigned). In this example, TCE 220 may be configured such that TCE 220 does not detect the parameter change event until the parameter of the second block is modified.

In some implementations, client device 210 may detect multiple parameter change events during model execution. For example, client device 210 may execute the parameter sample time block, may proceed with executing other blocks of the model, and may detect a first parameter change event. Client device 210 may re-execute the parameter sample time block based on detecting the first parameter change event, and may continue executing the model, as described below. In this example, client device 210 may detect a second parameter change event during the same execution of the model, may re-execute the parameter sample time block, and may continue executing the model until the model execution is complete (e.g., without detecting the occurrence of a third parameter change event). In this way, client device 210 may cause the parameter sample time block to be executed only when necessary (e.g., based on upon detecting a parameter change event), while still allowing the parameter sample time block to be responsive to parameter change events.

In some implementations, client device 210 may use the detection of the parameter change event in order to trigger further functionality associated with the model, such as logging data to a workspace, provide state information to the workspace, or the like. For example, the model may include a particular block that is configured to execute only upon detection of a parameter change event by client device 210. In this example, if client device 210 detects a parameter change event during execution of the model, then client device 210 may cause the particular block to be executed in order to execute a function associated with the particular block. For example, the block may compute its output values, may update its state values, may initiate a function call, or the like.

As further shown in FIG. 5A, if a parameter change event is not detected during the execution of the model (block 535—NO), then process 500 may include providing a result of executing the model (block 540). For example, client device 210 (e.g., TCE 220) may not detect a parameter change event during the execution of the model, and client device 210 may provide a result of executing the model. An example of output is shown in relation to FIG. 4I. As another example, client device 210 may detect a first parameter change event and may re-execute the parameter sample time block (as described below). In this example, client device 210 may not detect a second parameter change event during the execution, and client device 210 may provide a result of executing the model (e.g., when the model execution is complete). The result may include, for example, information determined during compilation of the model. Additionally, or alternatively, the result may include information associated with execution of the set of blocks included in the model, such as information relating to states of a computation, iterations of the model, etc. Additionally, or alternatively, the result may include information associated with re-execution of the parameter sample time blocks (e.g., information identifying parameter sample time blocks that were re-executed, information identifying one or more parameter sample time blocks that caused one or more other blocks to be re-executed, information identifying a time during execution at which the parameter sample time blocks were re-executed, etc.).

As further shown in FIG. 5A, if a parameter change event is detected during the execution of the model (block 535—YES), then, as shown in FIG. 5B, process 500 may include determining information associated with modifying a parameter of one or more blocks of the set of blocks included in the model (block 545). For example, if client device 210 (e.g., TCE 220) detects a parameter change event, then client device 210 may determine information associated with modifying a parameter of one or more blocks of the set of blocks included in the model (herein referred to as modification information).

In some implementations, client device 210 may determine the modification information based on user input. For example, the user may provide, via a dialog box associated with a block included in the model, input associated with modifying a parameter of the block, and client device 210 may determine the modification information based on the user input. For example, as shown in FIG. 4E, the user may provide input associated with modifying the constant value parameter of Constant2. In this example, TCE 220 may determine the modification information based on the user input associated with modifying Constant 2.

As an additional example, the user may interact with an HMI, associated with TCE 220, and client device 210 may determine the modification information based on information associated with the user interaction with the HMI. For example, an HMI may include a virtual representation (e.g., a graphical depiction) of a physical mechanism (e.g., a dial, a gauge, a slider, a lever, a button, etc.). The HMI may be configured such that the user may interact with the HMI (e.g., via a click and drag, etc.) in order to manipulate the HMI (e.g., to rotate a dial, to move a lever, to depress a button, etc.). Here, manipulation of the HMI may cause one or more parameters of a parameter sample time block (e.g., corresponding to the HMI) to be modified, and client device 210 may determine the modification information based on the manipulation of the HMI.

As another example, the user may interact with a logical workspace, via which a parameter is defined, in order to modify the parameter (e.g., when the parameter is called in a parameter sample time block using a symbol that represents the parameter in the logical workspace), and client device 210 may determine the modification information based on information provided by the user via the logical workspace.

In some implementations, the modification information may be associated with a parameter sample time block. Additionally, or alternatively, the modification information may be associated with multiple blocks (e.g., when the user modifies one or more parameters associated with multiple blocks included in the model).

In some implementations, TCE 220 may perform a validation associated with the modification information (e.g., by determining whether the modified parameter lies within an allowable range, etc.), perform a conversion associated with the modification information (e.g., by converting a value from a first data type to a second data type, etc.), perform a confirmation associated with modification information (e.g., by prompting the user to confirm the parameter change, etc.), and/or perform another type of task before accepting the modified parameter.

In some implementations, TCE 220 may store the modification information to allow a parameter sample time block to be re-executed at a later time. For example, if the user modifies a parameter of a parameter sample time block included in a subsystem that is not enabled, then TCE 220 may store the modification information to allow the parameter sample time block to be re-executed at a later time, such as when the subsystem is enabled (e.g., after model execution resumes, at a later time during execution, etc.). Additionally, or alternatively, if TCE 220 is configured to ignore that the subsystem is not enabled, then TCE 220 may execute the parameter sample time block upon detecting the parameter change event (e.g., TCE 22 may execute the parameter sample time block immediately).

In some implementations, TCE 220 may also determine protection information associated with the model. Protection information may include information indicating whether TCE 220 is to protect tasks, associated with executing the model, from being preempted as a result of a parameter change event. For example, the user may pause the execution of the model at a time when TCE 220 is performing a task (e.g., writing to a memory location associated with a block) that may be affected by the parameter change event. In this example, the protection information may be used to determine whether the task will be preempted by the parameter change event or whether TCE 220 will protect the task and allow the task to be completed without being affected by the parameter change event. This protection may be similarly effected without pausing the model by the user (e.g., when the parameter change event is detected while the model is being executed). In some implementations, TCE 220 may determine the protection information based on user input (e.g., a global setting indicating whether TCE 220 is to protect tasks associated with the model). Additionally, or alternatively, TCE 220 may determine the protection information without user input (e.g., TCE 220 may automatically determine the protection information).

In some implementations, client device 210 may implement a parameter protection technique based on receiving the modification information. For example, assume that a parameter (e.g., a numerical value) of a parameter sample time block is modified during model execution (e.g., without pausing the execution of the model). Here, if the parameter is modified as the numerical value is being read from memory, then a compromised numerical value may be obtained during execution of the model. In some implementations, client device 210 may prevent a compromised value from being obtained by implementing a parameter protection technique associated with modifying the parameter, such as by using callback in a simulation loop in order to modify the stored parameter value, by buffering the parameter modification and updating at a later time, or the like.

In some implementations, the parameter protection technique may be associated with executing the model on a first processor core and executing computations associated with modifying the parameter on a second processor core. For example, execution threads associated with the first processor core and the second processor core may communicate via shared memory. Here, it may be desirable to ensure that, when a value is read from the shared memory, the value is not being concurrently overwritten and/or modified. In such a case, computations associated with modifying the parameter (e.g., associated with the parameter change event) may be performed, but modified values may not be written to the shared memory. Rather, client device 210 may store the values in a separate memory location, and at a particular time (e.g., upon completion of a current major time step) the model execution may perform a method that determines whether modified values exist and, if so, the shared memory may be updated with the modified values (e.g., from the separate memory location) before continuing execution for the next major time step.

In some implementations, client device 210 may not immediately effect the parameter modification described by the modification information. For example, assume that a user modifies a parameter of a first parameter sample time block, but also wishes to modify a parameter of one or more other parameter sample time blocks (e.g., during execution of the model) before the parameter modification is effected. In this example, the user may indicate (e.g., via selection of a menu item, selection of a button, etc.) that client device 210 is not to effect the parameter modification to the first parameter sample time block (e.g., in order to allow the user may make additional parameter modifications). In this example, client device 210 may provide an indication to the user (e.g., by changing a color of the block, graying out the block, displaying an asterisk near the block, etc.) that the first parameter sample time block includes a parameter that has been modified with respect to the parameter being used to execute the model.

At a later time (e.g., after the users finishes modifying one or more other parameters), the user may provide (e.g., via an affordance associated with affecting the parameter modification) an indication to apply any parameter modifications made by the user, at which point client device 210 may effect the parameter modification to the first parameter sample time block (e.g., and any other modifications made by the user), and restore the visual appearance of the first parameter sample time block. In some implementations, the indication to effect the parameter modification may be provided by the user. Additionally, or alternatively, the indication to effect the parameter modification may be described by the model (e.g., by creating a block describing a condition that, when satisfied, triggers the parameter modification to be affected).

As further shown in FIG. 5B, process 500 may include receiving an indication to resume executing of the model (block 550). For example, client device 210 (e.g., TCE 220) may receive an indication to resume execution of the model. In some implementations, client device 210 may receive the indication to resume the execution of the model after client device 210 determines the modification information.

In some implementations, client device 210 may receive a command, from the user, to resume the execution of the model including the set of blocks. In some implementations, client device 210 may receive the command based on detecting a selection of a particular menu item, entry of a particular textual or audible input from the user, and/or entry of some other predetermined input that identifies the desire to resume the execution of the model. For example, as shown by reference number 465 of FIG. 4E, after detecting the parameter change event associated with Constant2, TCE 220 may receive user input (e.g., via a Resume menu item) that the execution of Model X is to resume.

As further shown in FIG. 5B, process 500 may include determining the execution list that includes the parameter sample time block (block 555). For example, client device 210 (e.g., TCE 220) may determine the execution list that includes the parameter sample time block. In some implementations, client device 210 may determine the execution list that includes the parameter sample time block after client device 210 receives the indication to resume the execution of the model. Additionally, or alternatively, client device 210 may determine the execution list after client device 210 determines the modification information (e.g., when the execution of the model is not paused based on detecting the parameter change event).

In some implementations, client device 210 may determine the execution list based on information stored by client device 210. For example, client device 210 may generate the execution list that includes the parameter sample time block, as discussed above, and may store the execution list in a memory location of client device 210. In this example, client device 210 may determine the execution list based on the stored information.

In some implementations, client device 210 may determine the execution list that includes the parameter sample time block regardless of whether the modification information is associated with the parameter sample time block. For example, assume that a model contains a group of parameter sample time blocks, included in a first execution list, and a group of blocks assigned discrete sample times and included in a second execution list. Further, assume that client device 210 detects, during execution of the model, a parameter change event based on the user modifying a parameter of a block included in the group of discrete sample time blocks, and the user indicates that the model execution is to resume. In this example, client device 210 may determine the execution list that includes the group of parameter sample time blocks even though none of the group of parameter sample time blocks were modified by the user. In other words, client device 210 may cause the parameter sample time blocks to be re-executed when any parameter, associated with any block in the model, is modified. For example, as shown in FIG. 4F, TCE 220 may cause each parameter sample time block (e.g., Constant1, Constant2, Lookup1, and SumB) to be re-executed since a parameter of a block included in Model X is modified. As another example, with respect to FIG. 4, TCE 220 may cause each parameter sample time block to be re-executed when a parameter of a block that is not a parameter sample time block is changed (e.g., TCE 220 may re-execute the parameter sample time blocks when a parameter of the Sine1 block (e.g., an amplitude of the sine wave) is modified.

Additionally, or alternatively, client device 210 may determine the execution list that includes the parameter sample time block only when a parameter sample time block, included in the execution list that includes the parameter sample time block, is modified. For example, TCE 220 may determine the execution list that includes the parameter sample time blocks, and may identify a subset of parameter sample time blocks, included in the execution list, that is to be executed in response to the parameter change event. In this example, TCE 220 may apply adaptive re-execution by identifying a subset of blocks of the group of parameter sample time blocks that are affected by the parameter change event, and causing the subset of blocks to be executed accordingly (e.g., rather than causing all of the parameter sample time blocks in the group of parameter sample time blocks to be re-executed). This example is illustrated in FIG. 4G. As shown in FIG. 4G, TCE 220 may apply adaptive re-execution by causing only those parameter sample time blocks affected by the parameter change event (e.g., Constant2, Lookup1, and SumB) to be re-executed (e.g., since Constant1 was not affected by the parameter change event).

As another example, TCE 220 may determine the execution list that includes the parameter sample time blocks, and may identify a parameter sample time block, included in the execution list, that is not to be executed in response to the parameter change event. In this example, TCE 220 may apply adaptive re-execution by identifying that the parameter sample time block, of the group of parameter sample time blocks, references a parameter that is defined as being non-tunable (e.g., a parameter that cannot be modified) after the execution of the model has started (e.g., after time t=0). Here, the parameter sample time block may reference a parameter that is defined independently of the block that references the parameter. For example, the user may define, via a command prompt associated with TCE 220, a parameter (e.g., P) using a particular command (e.g., P=parameter), may define a value of the parameter (e.g., P.value=3.4), and may define a tunability property of the parameter (e.g., P.tunability=@ t=0 only) indicating that the parameter may not be tuned after the execution of the model has begun. The user may then indicate that the parameter sample time block is to reference the defined parameter during model execution (e.g., by calling P within a parameter dialog box associated with the parameter sample time block). In this example, TCE 220 may determine the execution list that includes the parameter sample time block, may determine (e.g., based on the tunability property of P), that the parameter sample time block is not to be re-executed, and may cause other parameter sample time blocks, included in execution list, to be re-executed. In some implementations, as described in the above example, the tunability property may identify a time at which the parameter may be tuned or may not be tuned. Additionally, or alternatively, the tunability property may identify a time window during which the parameter may be tuned or may not be tuned (e.g., a tunability property indicating that the parameter may not be tuned during a first five seconds of model execution, a tunability property indicating that the parameter may be tuned between ten and fifteen seconds after the execution begins), a modification threshold associated with the parameter (e.g., a tunability property indicating that the parameter may be tuned if a value of the parameter is modified by less than a maximum amount, a tunability property indicating that the parameter may be tuned if a value of the parameter is modified by greater than a minimum amount, etc.).

As further shown in FIG. 5B, process 500 may include causing the parameter sample time block to be re-executed based on determining the execution list (block 560). For example, client device 210 (e.g., TCE 220) may cause the parameter sample time block to be re-executed based on determining the execution list that includes the parameter sample time block. In some implementations, client device 210 may cause the parameter sample time block to be re-executed after client device 210 determines the execution list. Additionally, or alternatively, client device 210 may cause the parameter sample time block to be re-executed after client device 210 receives the indication to resume the execution of the model.

In some implementations, client device 210 may cause the parameter sample time block to be re-executed first when resuming the execution of the model. For example, client device 210 may cause the parameter sample time block, included in the execution list, to be executed first when the model execution resumes (e.g., before other blocks included in other execution lists are executed). In this example, client device 210 may cause the parameter sample time block to be re-executed one time before proceeding with (e.g., repeatedly) executing the other blocks. In other words, client device 210 may cause parameter sample time block, included in the model, to be executed once when the execution of the model resumes. For example, as shown in FIG. 4F, TCE 220 may cause each of the parameter sample time blocks to be re-executed before proceeding with executing the other blocks of Model X. As another example, as shown in FIG. 4G, TCE 220 may cause a subset of the parameter sample time blocks to be re-executed before proceeding with executing the other blocks of Model X.

As further shown in FIG. 5B, process 500 may include resuming the execution of the model based on causing the parameter sample time block to be re-executed (block 565). For example, client device 210 (e.g., TCE 220) may resume the execution of the model based on causing the parameter sample time block to be re-executed. In some implementations, client device 210 may resume the execution of the model after client device 210 causes the parameter sample time block to be re-executed. For example, as shown in FIG. 4H, TCE 220 may resume the execution of Model X after TCE 220 causes the parameter sample time blocks to be re-executed.

Returning to FIG. 5B, in some implementations, client device 210 may resume the execution of the model, and process 500 may return to block 535. For example, client device 210 may resume the execution of the model, and client device 210 may wait to detect another parameter change event during the execution of the model. If client device 210 detects another parameter change event, then blocks 545 through block 565 may be repeated. This process may repeat until client device 210 does not detect a parameter change event and the execution of the model is complete. Client device 210 may then provide a result of executing the model, as described above with regard to block 540. In some implementations, client device 210 may provide the result of executing the model (e.g., continuously) during execution of the model.

Although FIGS. 5A and 5B shows example blocks of process 500, in some implementations, process 500 may include additional blocks, fewer blocks, different blocks, or differently arranged blocks than those depicted in FIGS. 5A and 5B. Additionally, or alternatively, two or more of the blocks of process 500 may be performed in parallel.

Implementations described herein may allow for detecting an un-modeled event during an execution of a model, causing one or more blocks, included in the model, to be re-executed in response to the un-modeled event, and continuing the execution of the model after causing the one or more blocks to be re-executed.

The foregoing disclosure provides illustration and description, but is not intended to be exhaustive or to limit the implementations to the precise form disclosed. Modifications and variations are possible in light of the above disclosure or may be acquired from practice of the implementations. For example, while implementations and/or examples described herein are described in the context of a parameter change event occurring while an execution of the model is paused, in other implementations and/or other examples, the parameter change event (e.g., and subsequent re-execution of parameter sample time blocks) may occur during model execution (i.e., without pausing the execution of the model).

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive a model including a group of blocks;
      receive a command to execute the model;
      assign, based on receiving the command, a parameter sample time to a subset of blocks of the group of blocks,
         the parameter sample time permitting a block, of the subset of blocks, to be executed based on a parameter change event detected during the execution of the model;
      cause the model to be executed after assigning the parameter sample time to the subset of blocks;
      detect a parameter change event, associated with the model, prior to the execution of the model being completed,
         the parameter change event including an event that is external to the execution of the model;
      cause at least one block, of the subset of blocks, to be executed based on the detecting the parameter change event.

2. The device of claim 1, where the parameter sample time indicates that each block, of the subset of blocks, is to be executed at a start of the execution of the model; and
   where the one or more processors, when causing the model to be executed after assigning the parameter sample time to the subset of blocks, are further to:
      cause the subset of blocks to be executed at a start of the execution of the model.

3. The device of claim 1, where the one or more processors, after detecting the parameter change event, are further to:
   cause the execution of the model to pause,
      the execution of the model being paused while the at least one block, of the subset of blocks, is executed based on detecting the parameter change event; and
   cause the execution of the model to resume after the at least one block is executed based on detecting the parameter change event.

4. The device of claim 1, where the one or more processors, when causing the at least one block, of the subset of blocks, to be executed, are to:
   cause the at least on block to be executed without pausing the execution of the model.

5. The device of claim 1, where the one or more processors are further to:
   identify one or more blocks, of the subset of blocks, that are affected by the parameter change event; and
   where the one or more processors, when causing the at least one block, of the subset of blocks, to be executed based on detecting the parameter change event, are further to:
      cause the one or more blocks that are affected by the parameter change event to be executed,
         at least one other block, of the subset of blocks, not being executed based on the detecting the parameter change event.

6. The device of claim 1, where the one or more processors, when causing the at least one block, of the subset of blocks, to be executed, are to:
   cause the at least one block to be executed by a target device associated with the model.

7. The device of claim 1, where the one or more processors are further to:
   identify a user interaction associated with the model,
      the user interaction occurring during the execution of the model, and the user interaction being associated with a dialog box for modifying a parameter of a block included in the group of blocks; and
where the one or more processors, when detecting the parameter change event, are further to:
detect the parameter change event based on the user interaction associated with the model.

8. A computer-readable medium storing instructions, the instructions comprising:
one or more instructions that, when executed by one or more processors, cause the one or more processors to:
receive a command to execute a model including a group of blocks;
compile the model based on receiving the command,
a parameter sample time being assigned to a subset of blocks, of the group of blocks, during the compiling,
the parameter sample time allowing a block, of the subset of blocks, to be executed based on an externally created event detected during the execution of the model;
cause the model to be executed based on compiling the model;
detect the externally created event before the execution of the model is completed;
cause at least one block, of the subset of blocks, to be executed based on detecting the externally created event; and
provide a result of executing the model.

9. The computer-readable medium of claim 8, where the one or more instructions, when executed by the one or more processors, further cause the one or more processors to:
determine a set of sample time propagation rules associated with the parameter sample time; and
where the one or more instructions, that cause the one or more processors to assign the parameter sample time to the subset of blocks, further cause the one or more processors to:
assign the parameter sample time to the subset of blocks based on the set of sample time propagation rules.

10. The computer-readable medium of claim 8, where the one or more instructions, that cause the one or more processors to cause at least one block, of the subset of blocks, to be executed based on detecting the externally created event, cause the one or more processors to:
cause the at least one block, of the subset of blocks, to be executed without pausing the execution of the model.

11. The computer-readable medium of claim 8, where the one or more instructions, when executed by the one or more processors, further cause the one or more processors to:
generate program code associated with the model,
the program code being generated such that a portion of the program code is generated into a start method of the model,
the portion of the program code including program code corresponding to at least one block, of the subset of blocks, to which the parameter sample time is assigned.

12. The computer-readable medium of claim 8, where the one or more instructions, when executed by the one or more processors, further cause the one or more processors to:
generate program code associated with the model,
the program code being generated such that a portion of the program code is generated into an output method of another block of the group of blocks,
the portion of the program code including program code that corresponds to at least one block, of the subset of blocks, to which the parameter sample time is assigned, and
the other block, of the group of blocks, being a block that lies downstream from the at least one block, of the subset of blocks, to which the parameter sample time is assigned.

13. The computer-readable medium of claim 12, where the one or more instructions, that cause the one or more processors to generate the program code associated with the model, further cause the one or more processors to:
compute an output of a block included in the subset of blocks,
the block including a parameter that may not be modified during the execution of the model;
store the output of the block,
generate the program code such that stored output is referenced in the program code,
the stored output being referenced allowing the output of the block to be statically determined during execution of the program code.

14. The computer-readable medium of claim 8, where the one or more instructions, when executed by the one or more processors, further cause the one or more processors to:
identify a user interaction associated with the model,
the user interaction occurring during the execution of the model, and
the user interaction being associated with a human machine interface (HMI) for modifying a parameter of a block included in the subset of blocks; and
where the one or more instructions, that cause the one or more processors to detect the externally created event, further cause the one or more processors to:
detect the externally created event based on the user interaction associated with the model.

15. The computer-readable medium of claim 8, where the one or more instructions, that cause the one or more processors to cause the at least one block, of the subset of blocks, to be executed, cause at least one block to be executed by a host device associated with the model.

16. A method, comprising:
receiving a model including multiple blocks,
the receiving the model being performed by a device;
receiving a command to execute the model,
the receiving the command being performed by the device; and
compiling the model based on receiving the command,
the compiling the model including:
assigning a sample time to a subset of blocks of the multiple blocks,
the sample time permitting a block, of the subset of blocks, to be executed based on an un-modeled event identified during an execution of the model, and the compiling the model being performed by the device.

17. The method of claim 16, further comprising:
causing the model to be executed based on compiling the model;
identifying the un-modeled event, associated with the model, prior to the execution of the model completing; and
causing one or more blocks, of the subset of blocks, to be executed based on identifying the un-modeled event.

18. The method of claim 17, where causing the one or more blocks, of the subset of blocks, to be executed based on identifying the un-modeled further comprises:

receiving user input indicating that the one or more blocks are to be executed; and causing the one or more blocks to be executed based on receiving the user input.

19. The method of claim 17 where causing the one or more blocks, of the subset of blocks, to be executed further comprises:

causing each block, of the subset of blocks, to be executed after identifying the un-modeled event.

20. The method of claim 17, further comprising:

identifying a user interaction associated with the model,
the user interaction occurring during the execution of the model, and
the user interaction being associated with a block, of the multiple blocks, that is not included in the subset of blocks; and where identifying the un-modeled event further comprises:
identifying the un-modeled event based on the user interaction associated with the model.

21. The method of claim 17, further comprising:

obtaining static scheduling information, associated with the one or more blocks,
the static scheduling information being determined during compilation of the model; and where causing the one or more blocks, of the subset of blocks, to be executed based on identifying the un-modeled event further comprises:
causing the one or more blocks to be executed in accordance with the static scheduling information.

22. The method of claim 16, further comprising:

generating program code associated with the model,
the generated program code including a separate entry point for program code that corresponds to at least one block, of the subset of blocks, to which the sample time is assigned.

* * * * *